United States Patent [19]

Staerzl

[11] Patent Number: 4,903,649
[45] Date of Patent: Feb. 27, 1990

[54] FUEL SUPPLY SYSTEM WITH PNEUMATIC AMPLIFIER

[75] Inventor: Richard E. Staerzl, Fond du Lac, Wis.

[73] Assignee: Brunswick Corporation, Skokie, Ill.

[21] Appl. No.: 279,573

[22] Filed: Dec. 2, 1988

Related U.S. Application Data

[63] Continuation-in-part of Ser. No. 178,383, Apr. 6, 1988, Pat. No. 4,840,148, which is a continuation-in-part of Ser. No. 95,356, Sep. 10, 1987, Pat. No. 4,763,626, which is a continuation-in-part of Ser. No. 25,270, Mar. 12, 1987, Pat. No. 4,750,464.

[51] Int. Cl.⁴ ............................................. F02B 33/04
[52] U.S. Cl. .................................... 123/73 A; 123/438; 123/494; 123/534; 73/118.2
[58] Field of Search ............... 123/73 A, 73 B, 73 PP, 123/357, 381, 438, 531, 532, 534; 73/118.2, 119 R, 861.02, 861.03; 364/510, 558

[56] References Cited

U.S. PATENT DOCUMENTS

| | | | |
|---|---|---|---|
| 3,884,195 | 5/1975 | Murtin et al. | 123/485 |
| 3,924,975 | 12/1975 | Hundertmark | 417/395 |
| 3,933,135 | 1/1976 | Zillman et al. | 123/494 X |
| 4,010,645 | 3/1977 | Herzl | 73/861.03 |
| 4,050,878 | 9/1977 | Priegel | 123/494 X |
| 4,125,093 | 11/1978 | Platzer, Jr. | 123/494 |
| 4,131,088 | 12/1978 | Reddy | 123/494 |
| 4,216,673 | 8/1980 | November | 73/861 |
| 4,244,332 | 1/1981 | Kusche et al. | 123/59 B |
| 4,250,745 | 2/1981 | Blatter et al. | 73/118.2 |
| 4,264,961 | 4/1981 | Nishimura et al. | 364/510 |
| 4,280,465 | 6/1981 | Staerzl | 123/494 |
| 4,290,394 | 9/1981 | Frank et al. | 123/73 A |
| 4,301,779 | 11/1981 | Hufton | 123/478 |
| 4,305,351 | 12/1981 | Staerzl | 123/73 A |
| 4,349,000 | 9/1982 | Staerzl | 123/491 |
| 4,391,254 | 7/1983 | Staerzl | 123/478 |
| 4,391,255 | 7/1983 | Staerzl | 123/481 |
| 4,401,085 | 8/1983 | Staerzl | 123/488 |
| 4,407,248 | 10/1983 | Takeuchi | 123/439 |
| 4,423,485 | 12/1983 | Sami et al. | 364/431.05 |
| 4,429,673 | 2/1984 | Staerzl | 123/491 |
| 4,502,325 | 3/1985 | Klomp | 73/118.2 |
| 4,523,572 | 6/1985 | Staerzl | 123/494 |
| 4,549,507 | 10/1985 | Baumhardt | 123/59 B |
| 4,549,517 | 10/1985 | Kamiyama | 123/478 |
| 4,562,744 | 1/1986 | Hall et al. | 73/861.02 |
| 4,612,895 | 9/1986 | Kuroiwa et al. | 123/494 |
| 4,617,892 | 10/1986 | Staerzl | 123/352 |
| 4,637,261 | 1/1987 | Kraus et al. | 73/861.02 |
| 4,644,474 | 2/1987 | Aposchanski et al. | 364/431.05 |
| 4,750,464 | 6/1988 | Staerzl | 123/494 |
| 4,763,626 | 8/1988 | Staerzl | 123/438 |
| 4,777,913 | 10/1988 | Staerzl et al. | 123/73 A |

FOREIGN PATENT DOCUMENTS 0153932 9/1984 Japan.

Primary Examiner—Willis R. Wolfe
Attorney, Agent, or Firm—Andrus, Sceales, Starke & Sawall

[57] ABSTRACT

A fuel control system for an internal combustion engine includes means for pneumatically amplifying sensed air flow pressure differential through an air intake venturi between a first combustion air pressure sensor outside the venturi and a second combustion air pressure sensor in the venturi. Pressure at the inner end of the second pressure sensor is reduced by altering the air flow path to create a vacuum at the inner end of the second pressure sensor relative to the remaining air flow through the venturi. A throttle plate in the venturi has a by-pass hole therethrough directing air flow along a given direction past the inner end of the sensor and through the by-pass hole when the throttle plate is in the idle position. The given direction of air flow past the inner end of the sensor prevents air flow into the inner end of the sensor tube to prevent an increase of sensed pressure thereat, and instead creates a vacuum to pull air out of the inner end of the sensor tube, to reduce pressure thereat. The system maintains a sufficient sensed pressure differential between the sensed pressure outside of the venturi and the sensed pressure in the venturi, including at idle, and also amplifies sensed pressure differential to provide improved tracking of fuel flow requirements between prescribed lean limit and rich limit requirements, including at idle and low speed.

23 Claims, 15 Drawing Sheets

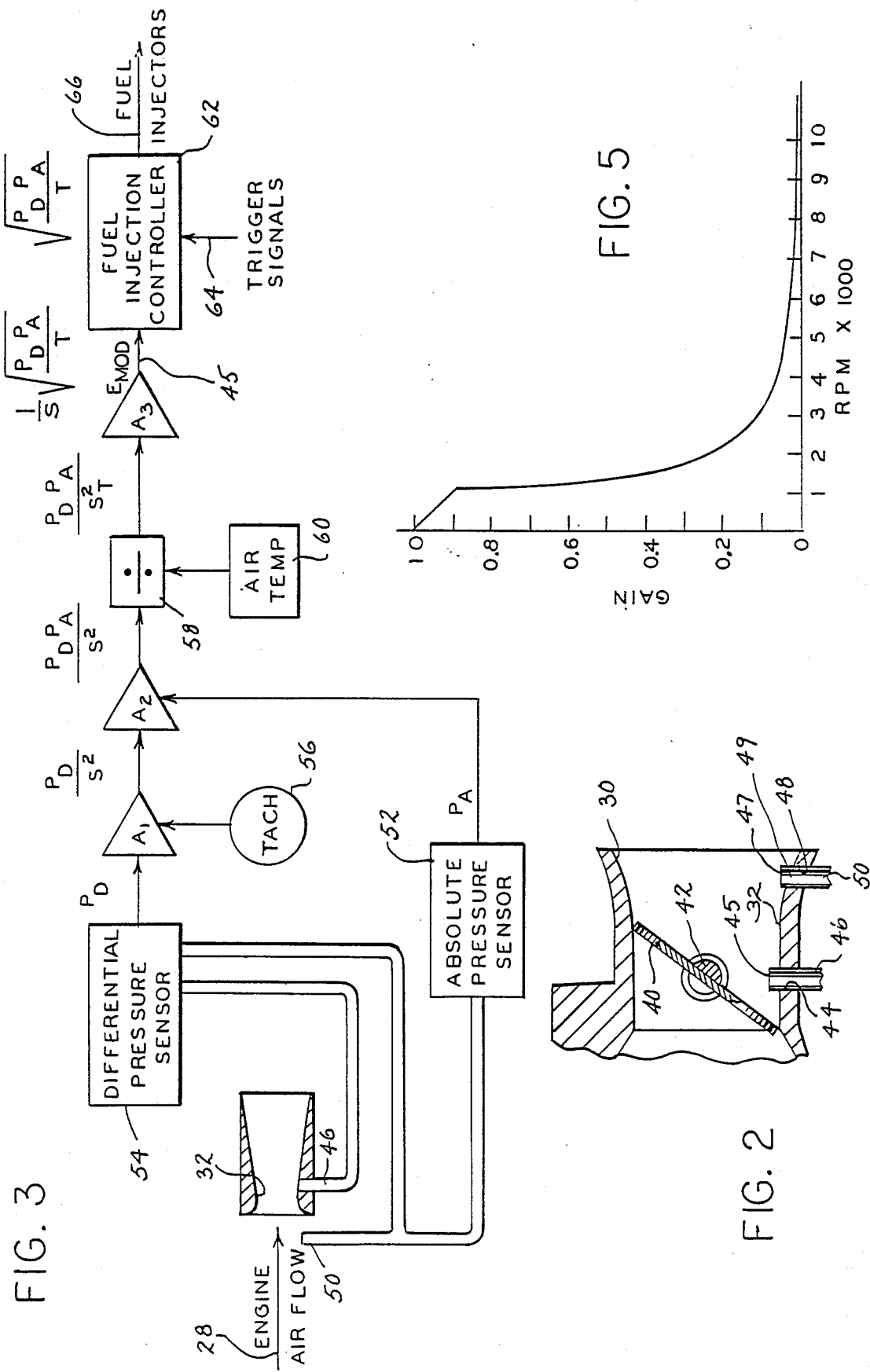

FUEL SUPPLY SYSTEM WITH PNEUMATIC AMPLIFIER

CROSS REFERENCE TO RELATED APPLICATIONS

This application is a continuation-in-part of application Ser No. 07/178,383, filed Apr. 6, 1988, now U.S. Pat. No. 4,840,148, which is a continuation-in-part of application Ser No. 07/095,356, filed Sept. 10, 1987, now U.S. Pat. No. 4,763,626, issued Aug. 16, 1988, which is a continuation-in-part of application Ser. No. 07/025,270, filed Mar. 12, 1987, now U.S. Pat. No. 4,750,464, issued June 14, 1988.

BACKGROUND AND SUMMARY OF PARENT INVENTIONS

The subject matter of my above noted '464 patent relates to an electronic fuel injection control system for an internal combustion engine. The system senses both the mass and flow velocity of combustion air for the engine and accordingly controls the amount of fuel injected, without determination from a preprogrammed look-up table according to throttle setting. The '464 parent invention eliminates the need for a throttle position sensor. The use of air mass and air flow velocity is called a mass flow system.

In a fuel injected engine, it is necessary to know the amount of air going into the engine in order to determine the amount of fuel to be injected, in order to provide the proper air-fuel ratio mixture. In a speed density system, for example as shown in my prior U.S. Pat. No. 4,305,351, hereby incorporated herein by reference, the amount of air going into the engine is determined indirectly by knowing ahead of time the typical amount of air entering the engine for a given throttle setting. The fuel requirements are then programmed in a look-up table memory. This type of system works well if the engine is a constant. However, if the engine is altered, then the look-up table for the fuel requirements must be reprogrammed. This is particularly objectionable in racing applications where the engine may be changed from day to day, or race to race, by providing different compression ratios, cylinder heads, camshafts, etc. The look-up table does not self-correct or automatically track the particular engine at hand.

It is common in marine racing applications to change cylinder heads, seeking higher compression ratios. This changes the operating and horsepower characteristics of the engine, and in turn requires that the speed density system be recalibrated in order to achieve optimum performance. In addition, it has been found in racing applications that the throttle position sensor has a very short life rating. With the high stresses and shock loading typical in racing, particularly on engines running close to 10,000 rpm, it is not uncommon for throttle position sensors to fail within a half hour. It is not unusual to replace the throttle position sensor after every race.

The '464 parent invention arose out of marine racing applications, though it is not limited thereto. The '464 parent invention senses air flow velocity and air mass to control the amount of fuel injected, without determination from a preprogrammed look-up table according to throttle setting. The '464 parent invention overcomes the above noted problems regarding reprogramming and recalibration upon alteration of the engine or use on different engines. The '464 parent invention also eliminates the need for a throttle position sensor, overcoming the above noted reliability problem.

The '464 parent invention provides a mass flow system which determines the amount of air coming into the engine by means of its velocity and mass. With this information, it is known how much fuel the engine needs. The system automatically tracks and self-adjusts to the particular engine at hand, and can be used on a altered engine or on another different engine, and will automatically readjust to the engine's fuel requirements, all without a look-up table. The automatic tracking is also desirable as the engine wears. As piston rings wear, the piston will pull in less air, and the electronic fuel injection control system will automatically lower the amount of fuel injected. Without this automatic adjustment, the fuel-air mixture would become richer.

One manner known in the prior art for measuring air flow is to use a hot film or a hot wire. The denser the air moving by the film, the more heat will be removed from the film. Also, the faster the air moves by the film, the more heat will be removed. The amount of energy needed to maintain a constant temperature of the film is measured, to indicate the amount of heat being pulled off by the air flowing by the film. A drawback of the hot film is that it is a very fragile device. Another problem is that the film must be relatively free of contamination. If there is dirt on the film, the dirt will act as an insulator and will change the measurement. It has also been found that water in the air stream dramatically adversely affects the hot film. Water is much denser than air, and extracts more heat. In marine applications, it is nearly impossible to keep water out of the engine, and hence such system is not suitable therefor.

Another approach known in the prior art for measuring air flow is to use a flapper valve. A spring loaded valve in the air stream is deflected by the air flow, and the amount of deflection measures the air flow. The disadvantage of this approach is that the flapper valve is in the air stream and blocks some of the air, acting like a throttle and reducing maximum horsepower. It has also been found that in rough water applications, the flapper may start oscillating or may even break off because of the shock loads experienced in racing. The rugged environment of marine racing thus rules out the flapper valve approach.

In the noted '464 parent invention, flow velocity of combustion air is measured by sensing air pressure drop across a venturi in the air intake manifold, and the mass of combustion air is measured by sensing air pressure and temperature.

The parent invention of my above noted '626 patent eliminates the need for a high pressure fuel pump, high pressure fuel injector and a constant fuel pressure regulator in a fuel injection system.

In a typical fuel injection system, fuel for combustion is precisely metered by a high pressure fuel injector which is open for a given length of time, determined by an injection pulse. This in turn requires that a supply of fuel at a known pressure be provided. Hence a high pressure fuel pump is needed together with a constant fuel pressure regulator. These precision components are costly.

The '626 parent invention enables the use of a relatively inexpensive low pressure solenoid for metering the fuel. There are no expensive high pressure fuel injectors. The system uses a standard relatively low pressure fuel pump, rather than a high pressure fuel pump.

Furthermore, the system does not need an expensive constant fuel pressure regulator.

In the parent invention of my above noted '383 application, a conduit is connected to the crankcase of a two cycle engine, preferably at a transfer passage or boost port, and delivers warmed pressurized air-fuel mixture to a fuel line branch downstream of the restriction orifice, to improve fuel atomization. In the preferred embodiment, the fuel line has a plurality of branches, one branch for each two cylinders. Each branch has a restriction orifice producing a fuel pressure drop indicating fuel flow velocity. Each branch has a pair of conduits supplying the noted warmed pressurized air-fuel mixture thereto downstream of the restriction orifice from a respective pair of cylinders having pistons with power strokes 180° apart. Each fuel line branch also has a pair of downstream sub-branches supplying fuel for the respective pair of cylinders.

BACKGROUND AND SUMMARY OF PRESENT INVENTION

The present invention arose during continuing development efforts regarding the subject matter of the above noted parent inventions.

In the present invention, a pneumatic amplifier is provided for amplifying the airflow signal through the venturi. An air by-pass hole is provided in the throttle plate proximate and downstream of the air flow sensor probe. The by-pass hole alters the direction of air flow past the sensor probe to change the sensed pressure thereat. Without the by-pass hole, air flows toward and into the sensor probe end tip. With the by-pass hole, air flows perpendicularly across the sensor probe end tip, or in an alternative embodiment, away from such end tip. Air flowing across or away from the sensor probe end tip tends to pull air out of the sensor probe tube, creating a vacuum and further reducing the pressure thereat, to thus provide a greater differential pressure $P_D$ between the absolute pressure outside of the venturi and the sensed reduced pressure in the venturi.

The invention provides improved performance results at low engine speeds and small throttle openings. Without the by-pass hole, fuel flow tracking has been observed outside of the acceptable lean and rich limits at low engine speeds. This in turn causes rough idling and low speed operation. With the by-pass hole, fuel flow tracking is found to be within the lean and rich limits at idle and low speed. This provides a smooth idle and improved low speed operation.

BRIEF DESCRIPTION OF THE DRAWINGS

Parent Inventions

FIG. 2 is a sectional view through a portion of the structure of FIG. 1.

FIG. 3 is a schematic block diagram of electronic control circuitry in accordance with the invention of the '464 parent patent.

FIG. 5 is a graph illustrating operation of a portion of the circuitry of FIG. 4.

Present Invention

Figure 17:
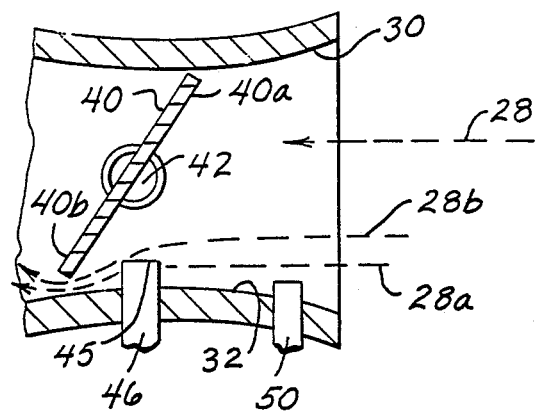

FIG. 17 is a view like FIG. 2 and shows air flow without the by-pass hole of the present invention.

Figure 18:
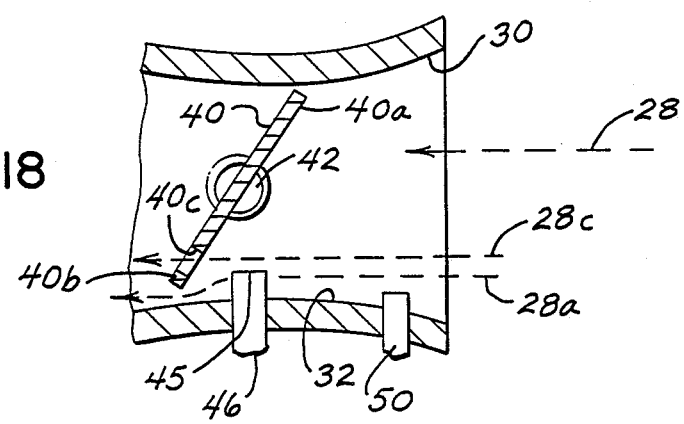

FIG. 18 is a view like FIG. 17 but shows air flow with a by-pass hole in the throttle plate in accordance with the invention.

Figure 19:
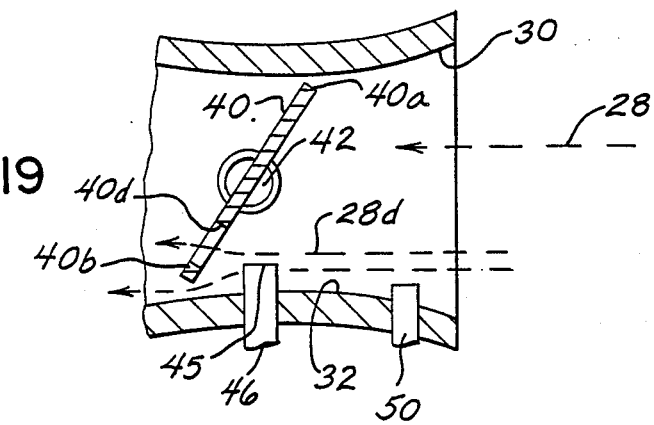

FIG. 19 is a view like FIG. 18 and shows a further embodiment.

Figure 20:
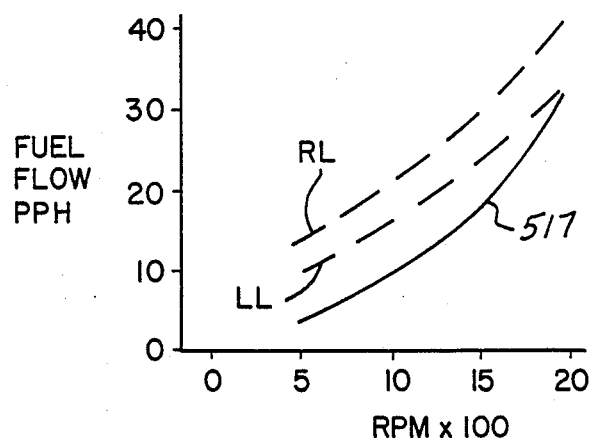

FIG. 20 is a graph illustrating performance of the structure of FIG. 17.

Figure 21:
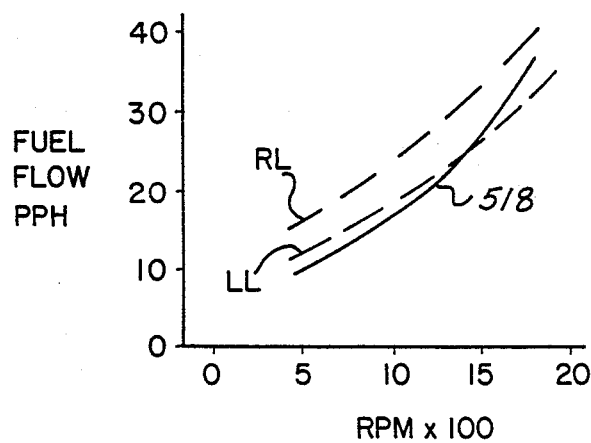

FIG. 21 is a graph illustrating performance of the structure of FIG. 18.

Figure 22:
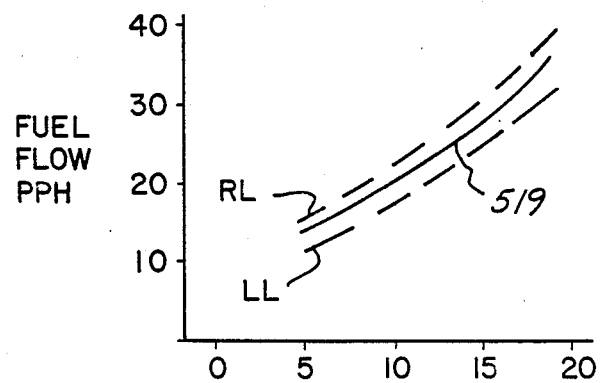

FIG. 22 is a graph illustrating performance of the structure of FIG. 19.

DETAILED DESCRIPTION

Parent Inventions

Figure 1:
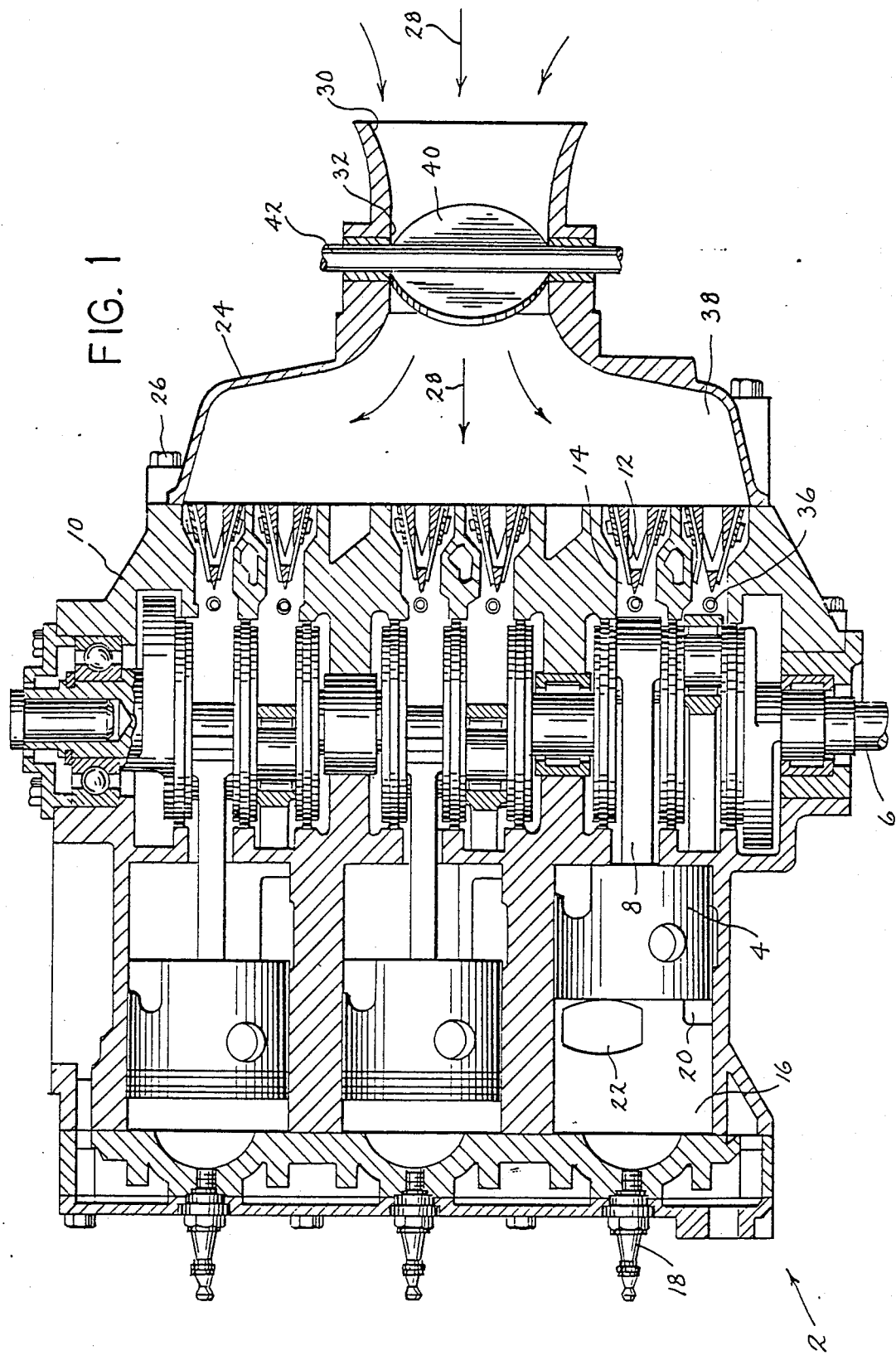
FIG. 1 is a sectional view through one of the cylinder banks of a V-6 marine internal combustion engine and control system in accordance with the invention of my above noted parent U.S. Pat. No. 4,750,464.

FIG. 1 shows a two cycle internal combustion engine 2 having a plurality of reciprocal pistons 4 connected to a vertical crankshaft 6 by connecting rods 8 in a cylinder block 10. FIG. 1 shows one bank of three cylinders in a V-6 engine. Piston 4 moves to the left during its intake stroke drawing a fuel-air mixture through one-way reed valves 12 into crankcase chamber 14. Piston movement to the left also compresses the fuel-air mixture in cylinder 16 for ignition by spark plug 18, which combustion drives piston 4 to the right generating its power stroke. During the movement of piston 4 to the right, the fuel-air mixture in crankcase chamber 14 is blocked by one-way reed valves 12 from exiting the crankcase and instead is driven through a transfer passage in the crankcase to port 20 in cylinder 16 for compression during the intake stroke, and so on to repeat the cycle, all as is well known. The combustion products are exhausted at port 22.

Air intake manifold 24 is mounted by bolts 26 to crankcase 10 and defines the air intake flow path as shown at arrows 28. The manifold includes an outer mouth 30 and a reduced inner diameter portion 32 providing a venturi through which the air flows. Fuel is injected into the crankcase downstream of the reed valves, for example as shown in incorporated U.S. Pat. No. 4,305,351 at fuel injectors 34 in FIGS. 2 and 3. The fuel injector tips are shown at 36. Alternatively, the fuel may be injected in plenum 38 upstream of the reed valves. Venturi 32 includes a butterfly valve 40 on rotatable shaft 42 for controlling air flow into manifold 24. Manifold 24 has a drilled passage 44 therethrough, FIG. 2, at venturi 32 which receives a tube 46 for sensing pressure at venturi 32. Manifold 24 has another drilled passage 48 therethrough at outer mouth 30 which receives a tube 50 for sensing pressure thereat. As air flows through venturi 32, there is a pressure drop according to Bernoulli's principle. Tube 46 is open at its end 45 and senses the reduced pressure in venturi 32. Tube 50 senses the absolute pressure outside of the venturi. Tube 50 is closed at its end 47 and has a small hole in its side 49 facing upstream. When butterfly valve 40 is closed, it is at an angle of approximately 30° relative to a plane normal to air flow path 28. Tube 46 is adjacent shaft 42 and upstream of valve 40.

As noted, venturi 32 in air intake manifold 24 produces a pressure drop. Absolute pressure sensor 52, FIG. 3, for example a Microswitch 136PC, measures absolute air pressure $P_A$ outside of venturi 32 at tube 50. Differential pressure sensor 54, for example a Microswitch 176PC, measures the differential pressure $P_D$ between the absolute pressure outside of the venturi at tube 50 and the reduced pressure in the venturi at tube 46. Engine speed S measured by tachometer 56 is squared by amplifier A1 and also divided by amplifier A1 into $P_D$, and the result is multiplied by $P_A$ at amplifier A2, which result is divided at 58 by air temperature T from temperature sensor 60. Amplifier A3 performs a square root function whose output is the signal $E_{MOD}$ on line 45 in FIG. 11 of incorporated U.S. Pat. No. 4,305,351. The signal $E_{MOD}$ is supplied to the fuel injection controller 62 provided by the one or more square wave pulse generators in FIG. 11 of incorporated U.S. Pat. No. 4,305,351, which are triggered by one or more ignition pulses shown as FIRE CYL. #1 and FIRE CYL. #4 in FIG. 11 of incorporated U.S. Pat. No. 4,305,351. These ignition pulses provide the trigger signals on line 64, FIG. 3, to the fuel injection controller which in turn outputs injection pulses on line 66 to the fuel injectors, as shown at the one or more lines 48, 49 in FIG. 11 of incorporated U.S. Pat. No. 4,305,351. The length of the injection pulses on line 66, FIG. 3, is determined by $\sqrt{P_D P_A/T} \cdot \sqrt{P_D}$ measures air flow velocity. $\sqrt{P_A/T}$ measures air mass. The frequency of the ignition or trigger signals on line 64 corresponds to engine speed and hence cancels out the factor 1/S in the $E_{MOD}$ signal.

The differential pressure $P_D$ varies over a wide range, from a minimum at idle speed to a maximum at high engine speed. The low end signal may be too small for the amplifier unless an inordinate amount of gain is provided. On the other hand, the high end signal may saturate the amplifier unless the gain is reduced. These factors limit the dynamic range. One solution is to provide a greater pressure drop by further reducing the constriction of the venturi. However, it is not desirable to reduce the constriction of the venturi too much because this would hinder air flow and reduce power, etc. In the preferred embodiment, the inner diameter at mouth 30 is about five inches and the inner diameter at venturi 32 is about three inches. The dynamic range dilemma is solved by reducing the differential pressure signal as engine speed increases. The amplifier can thus be provided with enough gain to amplify the low end signals at idle speed, and yet not saturate at high speed. $P_D$ is reduced by a factor of $S^2$.

Figure 4:
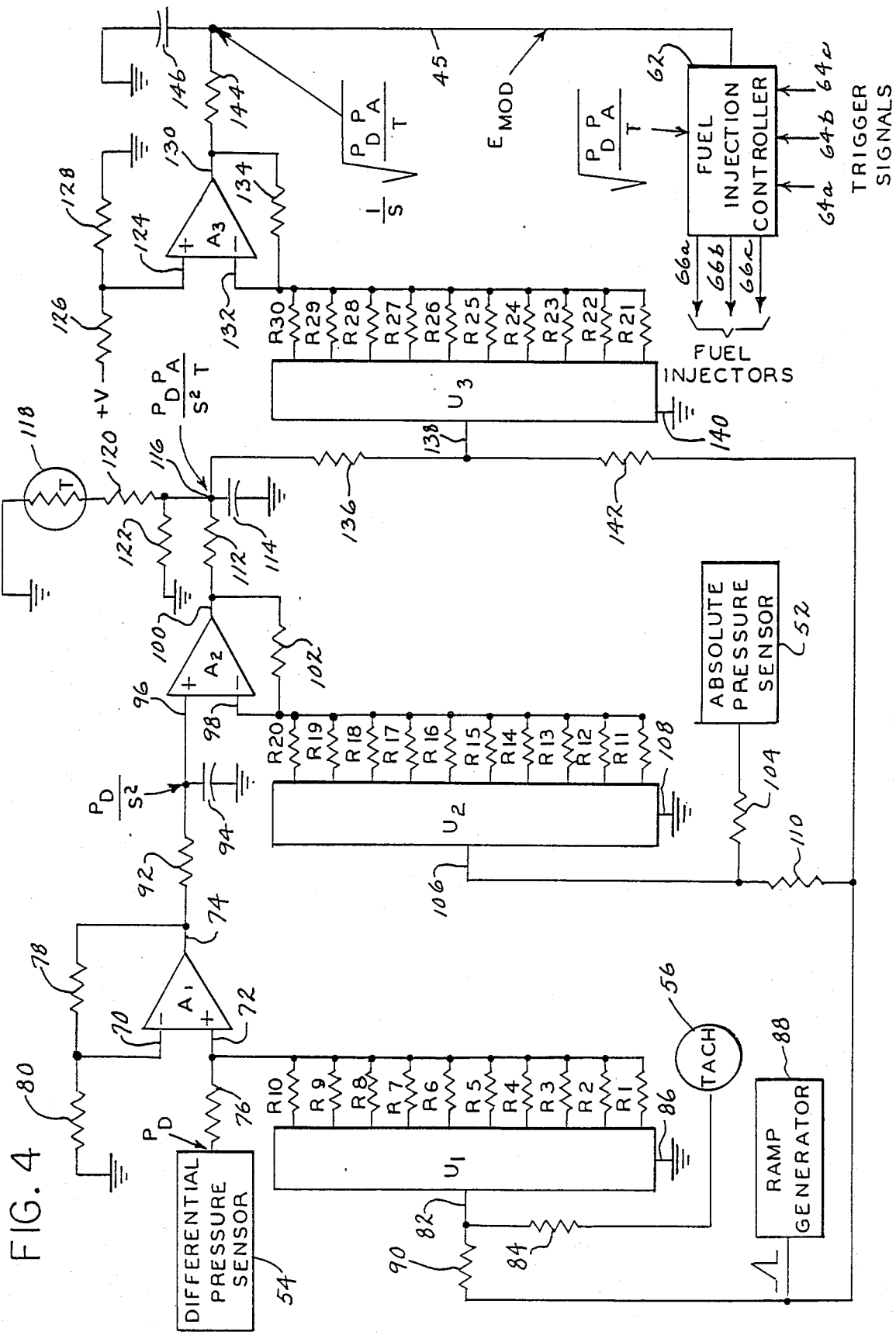
FIG. 4 is a more detailed circuit diagram of the circuitry of FIG. 3.

Referring to FIG. 4, amplifier A1 has an inverting input 70, a noninverting input 72 and an output 74. The output of differential pressure sensor 54 is connected through resistor 76 to input 72 of amplifier A1. The output 74 of amplifier A1 is connected in a voltage divider network formed by resistors 78 and 80 in a feedback loop to input 70 to set the gain of amplifier A1. An LED chip driver U1, for example an LM3914, has an input 82 from tachometer 56 through resistor 84, and has a plurality of outputs including respective resistors R1–R10 connected in parallel to input 72 of amplifier A1. As engine speed increases, the voltage at U1 input 82 from tachometer 56 increases, which in turn sequentially turns on resistors R1 through R10 in stepwise manner. When the first output turns on, resistor R1 is connected in circuit with amplifier input 72 such that current flows from input 72 through resistor R1 to ground reference at 86. This sinking of current through resistor R1 from input 72 lowers the voltage at input 72 which in turn reduces the voltage at amplifier output 74 because less gain is needed to keep the voltage at input 70 equal to that at input 72. As engine speed continues to increase, the voltage at U1 input 82 increases, and when it reaches the next threshold, the output at R2 is turned on to also connect resistor R2 in circuit with amplifier input 72 such that additional current flows from input 72 through resistor R2 to ground reference at 86, thus further lowering the voltage at amplifier input 72 and hence lowering the voltage at amplifier output 74. As engine speed continues to increase, the voltage at input 82 increases, and the remaining resistors R3 through R10 are sequentially turned on.

The values of resistances R1 through R10 are chosen to provide the noted quadradic squaring and division function to yield $P_D/S^2$. In FIG. 4, the resistance values for resistors R1–R10 are, respectively: 909 K ohms; 30.1 K ohms; 17.8 K ohms; 12.7 K ohms; 10.0 K ohms; 8.06 K ohms; 6.81 K ohms; 5.90 K ohms; 5.23 K ohms; and 4.64 K ohms. FIG. 5 shows a graph of relative gain of amplifier A1 for the output signal at 74 versus engine speed, and illustrates the decreasing quadradic relationship with increasing engine speed. The smooth nature of the curve is facilitated by ramp generator 88 providing a superimposed ramp voltage through resistor 90 to U1 input 82 which periodically rises to a maximum voltage level about 1/10th that of the maximum tachometer voltage. Ramp generator 88 is an RC oscillator running at a substantially higher frequency, e.g. 100 hertz, than the progression of threshold steps of U1, i.e. the ramp generator will go through many cycles between each of the threshold steps for turning on R1 through R10. The superimposed oscillatory higher frequency ramp voltage provides a small ripple in the voltage at input 82 which provides a more gradual turning-on of the next threshold step, rather than an abrupt turn-on of the next resistance, and hence smooths out the otherwise stepwise incrementation of voltage at amplifier input 72, and provides a more smoothly varying variable resistance attenuator. Resistor 92 and capacitor 94 provide an RC filter filtering out the ramp generator frequency at the output of amplifier A1.

Amplifier A2 has a noninverting input 96 receiving the signal $P_D/S^2$, an inverting input 98 and an output 100. Output 100 is connected to input 98 in a feedback loop including a voltage divider network formed by resistor 102 and parallel resistors R11-R20 in the outputs of LED chip driver U2, such as an LM3914. Absolute pressure sensor 52 is connected through resistor 104 to U2 to input 106. As the absolute air pressure increases, the increasing voltage at U2 input 106 sequentially turns on resistors R11-R20 in stepwise manner as the various switching thresholds are reached. As more outputs of U2 are turned on, more resistors are connected in parallel between amplifier input 98 and ground reference 108, which in turn sinks more current through the respective resistors from amplifier input 98, thus lowering the voltage at input 98. The lower voltage at amplifier input 98 causes the voltage at amplifier output 108 to increase because such increased gain is necessary to maintain the voltage at input 98 equal to that at amplifier input 96.

The values of resistances R11-R20 are chosen to provide a linear multiplying function, in order to multiply $P_D/S^2$ by $P_A$. Resistors R11-R20 each have the same resistance, 100 K ohms. The voltage from ramp generator 88 is applied through resistor 110 to be superimposed and added to the voltage at U2 input 106 to smooth out the stepwise changing of resistance at the outputs of U2, in order to provide a smoother change. The ramp generator frequency is later filtered out at the RC filter provided by resistor 112 and capacitor 114 at the output of amplifier A2.

The divider function 58 of FIG. 3 is provided at node 116 in FIG. 4. Temperature sensor 60 is a negative temperature coefficient thermistor 118 connected between node 116 and ground reference, and physically located at inlet mouth 30 to sense ambient air temperature. A resistor 120 is connected in series between node 116 and NTC thermistor 118, and a resistor 122 is connected in parallel with NTC thermistor 118 between node 116 and ground reference. As temperature increases, the resistance of NTC thermistor 118 decreases, and more current is conducted therethrough from node 116, which in turn lowers the voltage at node 116, providing the divide by T function. Resistor 120 has a substantially lower resistance value than resistor 122. At low temperature, the resistance value of thermistor 118 is high, and most of the current from node 116 flows through resistor 122. At high temperature, the resistance value of thermistor 118 is low, and most of the current from node 116 flows through resistor 120 and thermistor 118, because such branch provides the lower resistance path at high temperature. Resistors 122 and 120 have a ratio of about a 100 to 1 and tend to linearize the response of thermistor 118, to provide a more linear divide by T function, such that the output voltage from amplifier A2 is more linearly reduced with increasing temperature.

Amplifier A3 has a noninverting input 124 connected to a voltage source +V through a voltage divider network formed by resistors 126 and 128. Amplifier A3 has an output 130 connected to noninverting input 132 in a feedback loop including the voltage divider network formed by resistor 134 and resistors R21-R30 which are connected to respective parallel outputs of LED chip driver U3, such as an LM3914. The voltage at node 116, representing, $(P_D P_A)/S^2$, is supplied through resistor 136 to the input 138 of U3. As the voltage at input 138 increases, the outputs of U3 are sequentially turned on in stepwise manner, to connect more resistors to amplifier input 132, to in turn sink more current through the respective parallel resistors from amplifier input 132 to ground reference 140, to lower the voltage at amplifier input 132. The lower voltage at amplifier input 132 causes an increased voltage at amplifier output 130 because more gain is needed to keep the voltage at input 132 equal to that at input 124.

The values of resistances R21-R30 are chosen to provide the square root function and are respectively: 383 K ohms; 191 K ohms; 249 K ohms; 294 K ohms; 332 K ohms; 374 K ohms; 402 K ohms; 432 K ohms; 475 K ohms; and 487 K ohms. Oscillatory ramp voltage from ramp generator 88 through resistor 142 is superimposed and added at input 138 to smooth out the step changes as the switching thresholds are reached for turn-on of the outputs having resistors R21 through R30. The ramp voltage frequency is later filtered out by the RC filter formed by resistor 144 and capacitor 146.

Figure 11:
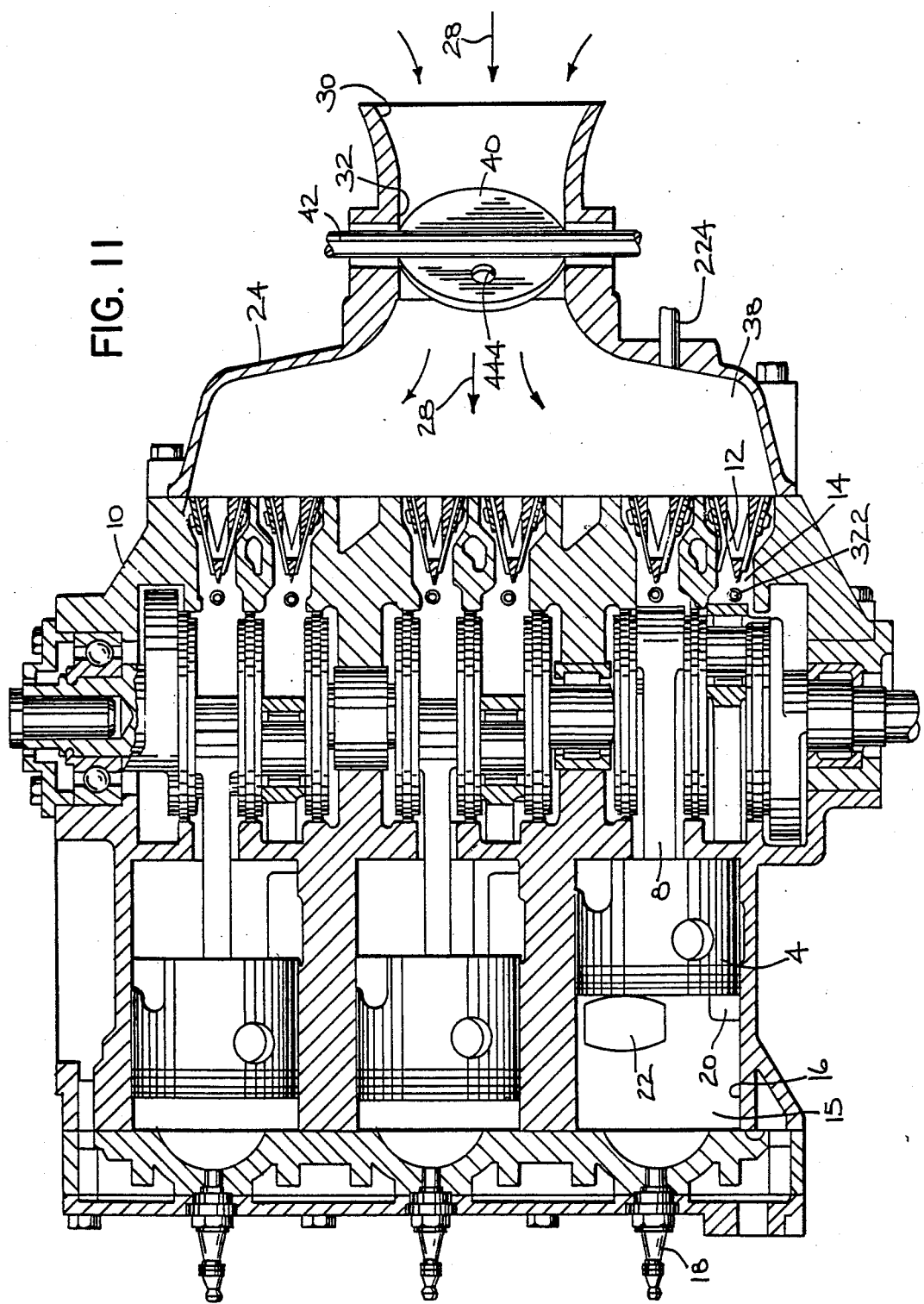
FIG. 11 is a view similar to FIGS. 1 and 8 and shows modifications.

The output of amplifier A3 provides the $E_{MOD}$ signal on line 45 which is the $E_{MOD}$ signal on line 45 in FIG. 11 of incorporated U.S. Pat. No. 4,305,351. FIG. 11 of incorporated U.S. Pat. No. 4,305,351 shows two square wave pulse generators 46 and 47 in accordance with the timing system in FIG. 5 thereof. In the above noted parent invention of U.S. Pat. No. 4,750,464, the timing system in FIG. 6 of incorporated U.S. Pat. No. 4,305,351 is preferred, with three square wave pulse generators each of which is supplied with the $E_{MOD}$ signal, and each of which receives its respective injection trigger signal 64a, 64b, 64c provided by the respective ignition pulses indicated as FIRE #1, FIRE #3 and FIRE #5 in FIG. 6 of incorporated U.S. Pat. No. 4,305,351. Likewise, instead of two output injection pulses shown as 48 and 49 in FIG. 11 of incorporated U.S. Pat. No. 4,305,351, the parent system includes three output injection pulses 66a, 66b, 66c respectively providing INJECT #3, 4, INJECT #5, 6, INJECT #1, 2 in FIG. 6 of incorporated U.S. Pat. No. 4,305,351. The frequency of the ignition trigger pulses corresponds to engine speed and hence cancels the term 1/S in the $E_{MOD}$ signal. The square wave generators are triggered by the ignition trigger signals, and the length of the injection pulses output therefrom equal $k \sqrt{P_D P_A/T}$, where k is a constant.

The square root generator function provided by A3 and U3 includes a failsafe region in the event differential pressure sensor 54 fails or the voltage at U3 input 138 drops to zero. Even with a zero input at 118, it is still desired that a certain level voltage output be generated at the amplifier output on line 45 so that there will be at least some fuel injection pulse length generated in order to inject enough fuel to keep the engine running and at least get home, albeit not at peak power. This minimum fuel supply is considered desirable and provides a limp home feature so that the boat operator will not be stranded in the middle of the lake. Amplifier A3 is thus preferably provided with a minimum gain even if each of the U3 outputs through respective resistors R21-R30 is nonconductive, which gain is set by resistor 114. Because of this gain, the value of resistance R21 is selected out of sequence with the other resistances R22-R30 as above noted.

The '464 parent invention is preferably implemented in analog circuitry, as disclosed above, though it can also be implemented by digital circuitry including a microprocessor. Analog circuitry is preferred because of its better noise immunity. For example, an ignition spike in an analog system may cause a momentary purturbation, but the system will keep running. In a digital system, such ignition spike may fill or lock-up a register such that the next component gets the wrong operational code, and the system may shut down. Marine racing applications involve high speeds and extremely noisy environments, and hence the analog circuitry is desirable. If digital or microprocessor circuitry is used, it is still preferred that the interfacing of the differential pressure sensor be done after the sensor's analog output is reduced with increasing engine speed, to improve the sensor's dynamic range.

It is thus seen that a mass flow fuel injection control system is provided for an internal combustion engine having air intake means supplying combustion air to the engine, and fuel injector means supplying fuel to the engine. Flow velocity of the combustion air is determined by measuring $P_D$ and calculating $\sqrt{P_D}$. Air mass is determined by measuring $P_A$ and T and calculating $\sqrt{P_A/T}$. The circuitry responds to the measured values $P_D$, $P_A$ and T to control the amount of fuel injected according to air flow velocity and air mass as calculated by $\sqrt{P_D P_A/T}$.

Figure 6:
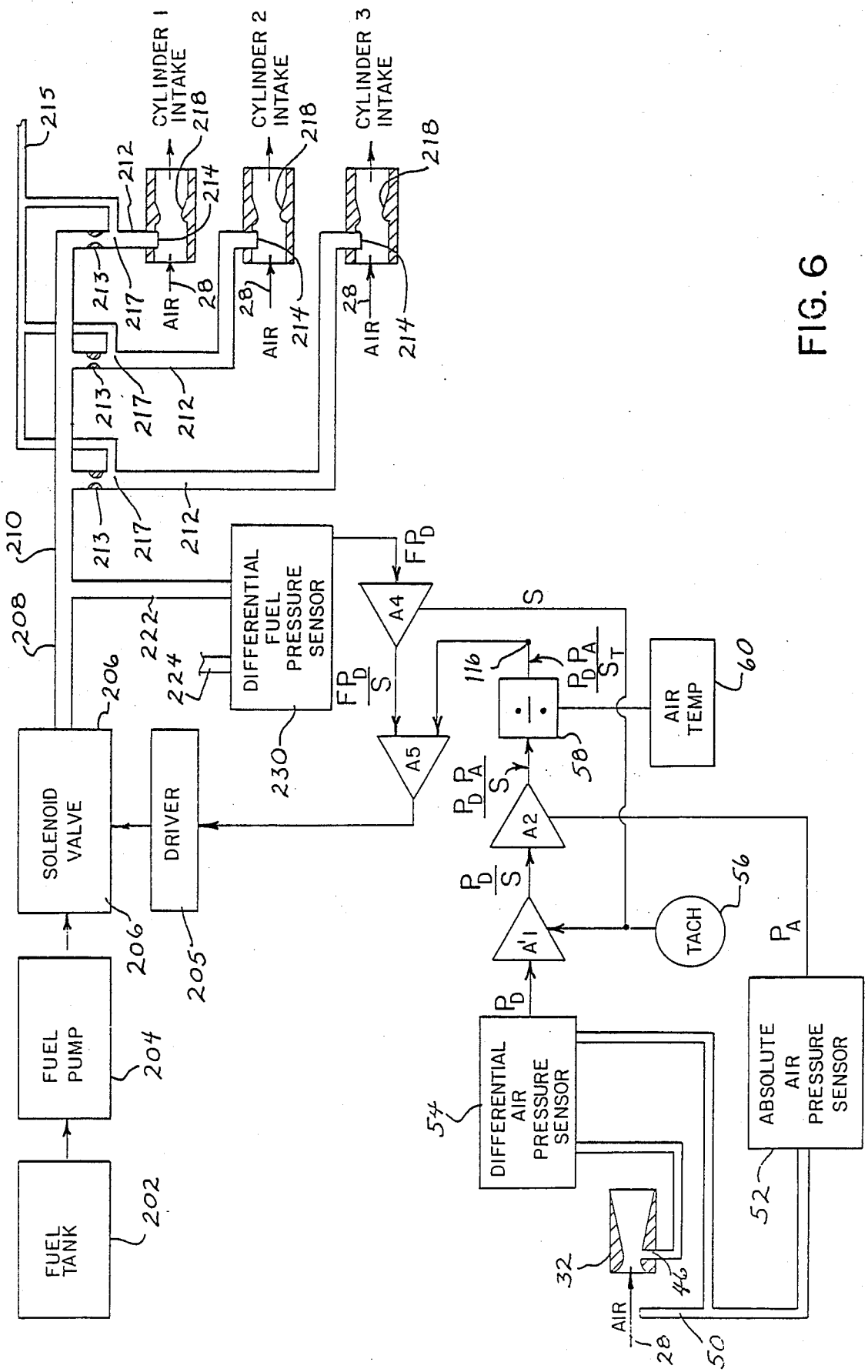
FIG. 6 is a schematic block diagram of electronic control circuitry in accordance with my above noted parent U.S. Pat. No. 4,763,626.
Figure 7:
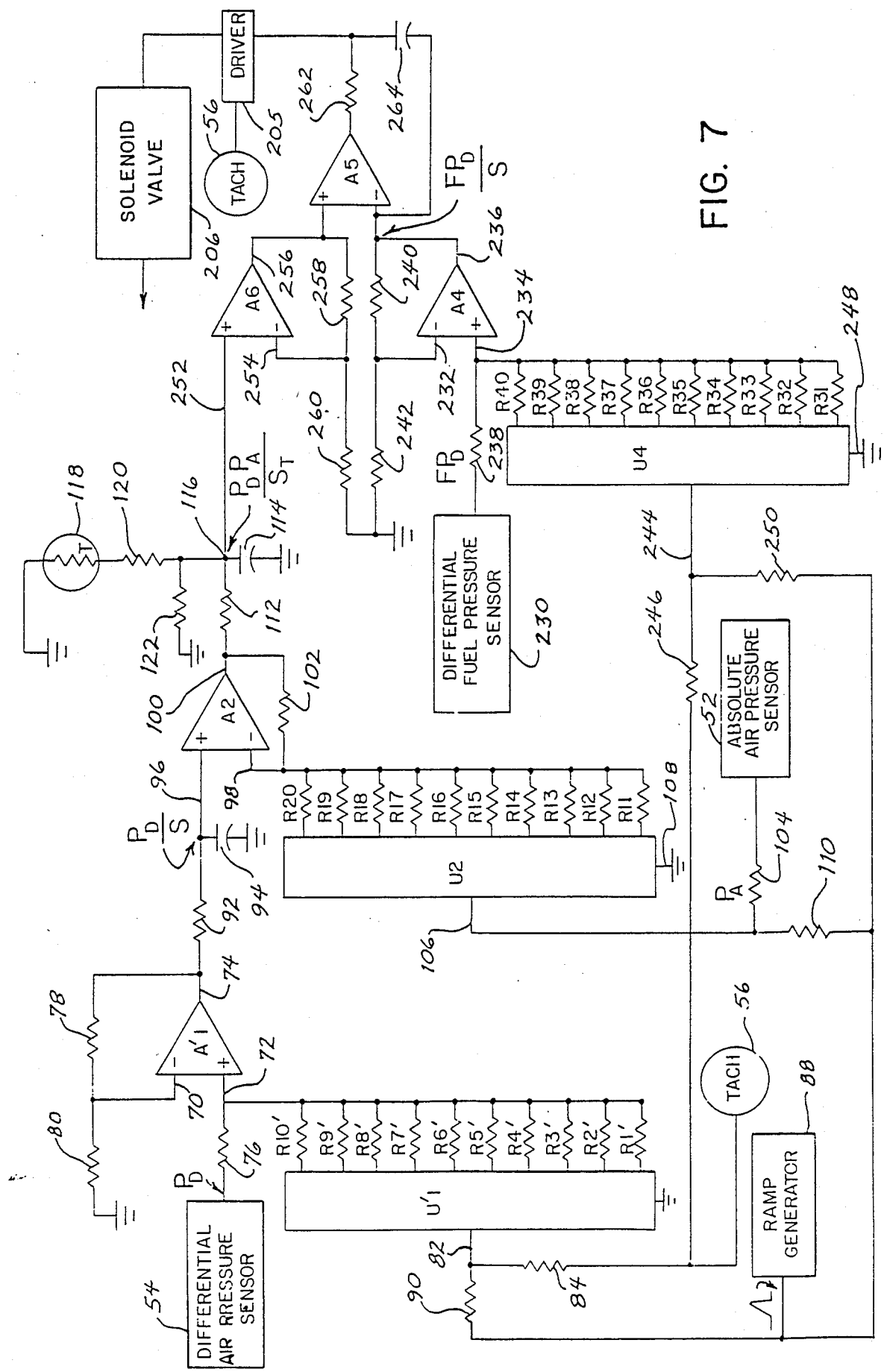
FIG. 7 is a more detailed circuit diagram of the circuitry of FIG. 6.
Figure 8:
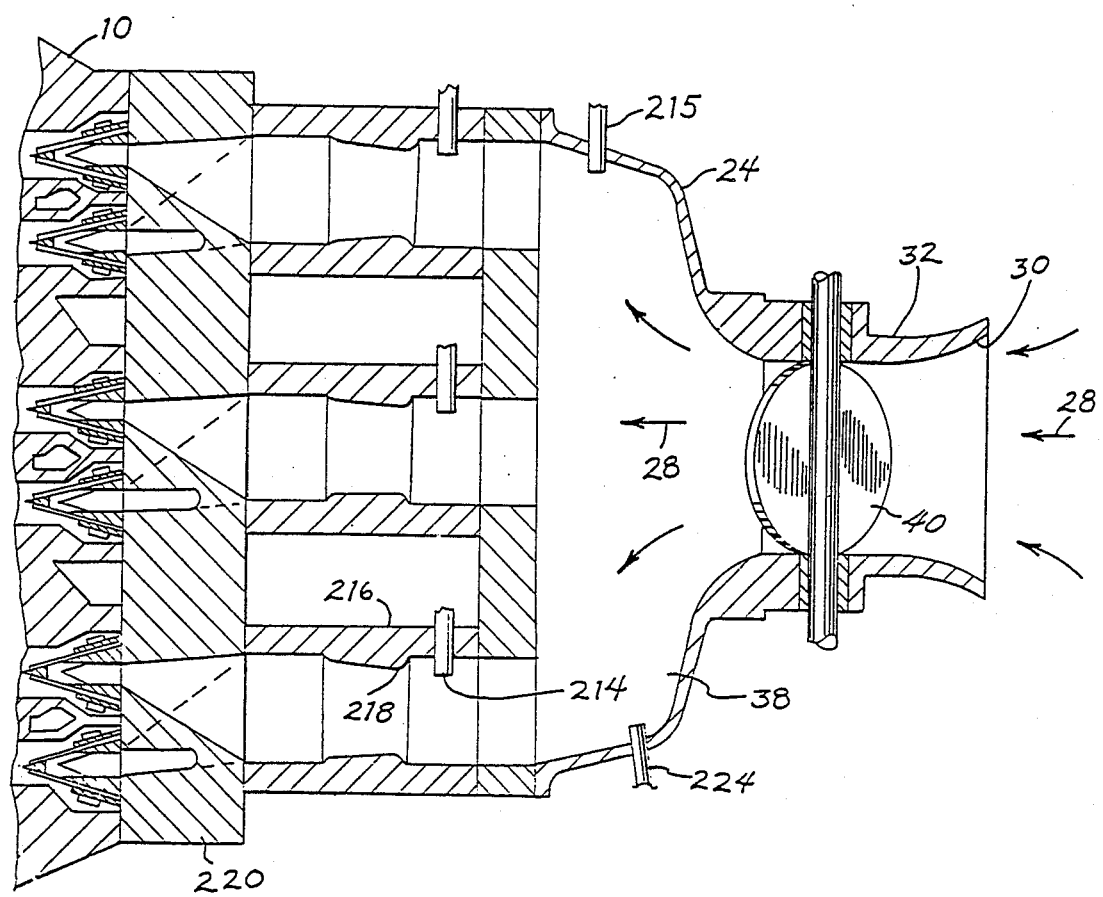
FIG. 8 is a view similar to that in FIG. 1 and shows modifications.

FIGS. 6–8 show the system of my above noted parent U.S. Pat. No. 4,763,626 and use like reference characters from FIGS. 1–5 where appropriate to facilitate clarity. Amplifier A1' in FIGS. 6 and 7 performs a divide by S function, rather than the divide by $S^2$ function of FIGS. 3 and 4. The values of resistances R1'–R10' are chosen to provide the linear dividing function, in order to divide $P_D$ by S. Resistors R1'–R10' each have the same resistance, 100 k ohms. Dividing $P_D$ by S increases dynamic range. $P_D$ can be divided by other powers of S; the higher the power, the greater the dynamic range. Amplifer A2 performs the same linear multiplying function as in FIGS. 3 and 4, in order to multiply $P_D/S$ by $P_A$. The divider function 58 is provided at node 116, as in FIGS. 3 and 4. The square root function of FIGS. 3 and 4 is not performed in FIGS. 6 and 7.

Referring to FIG. 6, fuel is supplied from fuel tank 202 by a standard low pressure fuel pump 204, operated by pressure changes in the crankcase, for example *Outboard Service Training Notebook*, Brunswick Corp. Bulletin 90-90592 2-985, pages 10–11, Mariner fuel pumps, and for example as shown in U.S. Pat. No. 3,924,975, incorporated herein by reference. The amount of fuel supplied to the engine is controlled by a solenoid valve 206, for example a Brunswick Corp. Mercury Marine Part No. 43739 solenoid valve. The fuel is metered by the solenoid into a fuel line 208 supplying fuel to fuel rail 210 which feeds each of the cylinders through respective parallel passages 212. Each passage 212 has a delivery outlet 214 delivering fuel to an atomizer venturi 216 upstream of the restrictive portion 218 of the venturi. There are no high pressure fuel injectors in any of the passages 212. Venturi 216, FIG. 8, receives air at 28 from plenum 38 of intake manifold 24, and atomizes the fuel from outlet 214 and delivers the fuel/air mixture to the respective cylinder. Venturis 216 are mounted by adapter plate 220 to the crankcase, as shown in U.S. Pat. No. 4,244,332, incorporated by reference.

Each passage 212 has an orifice 213 of a restricted diameter opening for metering fuel flow therethrough, and to produce a fuel pressure drop thereacross according to Bernoulli's principle. The fuel pressure drop indicates fuel flow velocity. Tube 222 senses fuel pressure upstream of restriction orifice 213 at fuel line 208. Tube 224 senses the pressure downstream of restriction orifice 213 at outlet 214 by sensing the pressure in plenum 38 of manifold 24 which is at substantially the same pressure as outlet 214.

In a marine outboard engine, the cylinders are vertically aligned. In a V-shaped design, each bank of cylinders is vertically aligned. Orifices 213 are higher than the highest of outlets 214. The low pressure downstream of orifices 213 may not be sufficient to push the fuel uphill, and hence the gravity type feed is desired as provided by orifices 213 higher than outlets 214. An air line 215 is connected between plenum 38 and a bleed hole 217 in each of passages 212. It has been found that this air line prevents siphoning of fuel which may otherwise occur because the cylinders are at different heights. Air line 215 also ensures that the downstream side of orifices 213 are at the same pressure as plenum 38.

Differential fuel pressure sensor 230, for example a microswitch 176 PC, measures the differential pressure $FP_D$ across orifice 213, i.e. the pressure upstream of orifice 213 at tube 222 and the pressure downstream of orifice 213 at outlet 214 and tube 224. Amplifier A4 divides $FP_D$ by engine speed S to yield $FP_D/S$. Amplifier A5 compares $FP_D/S$ to $(P_D P_A)/ST$ and controls solenoid 206 to supply more or less fuel according to the amount of combustion air as represented by $(P_D P_A)/ST$ and the fuel flow velocity as represented by $FP_D/S$. The divide by S function is preferred because it increases dynamic range of the system, as above, though it can be deleted. Other powers of S can be used as the dividend.

Amplifier A4 has an inverting input 232, FIG. 7, a noninverting input 234 and an output 236. The output of differential fuel pressure sensor 230 is connected through resistor 238 to input 234 of amplifier A4. The output 236 of amplifier A4 is connected in a voltage divider network formed by resistors 240 and 242 in a feedback loop to input 232 to set the gain of amplifier A4. An LED chip driver U4, for example an LM3914, has an input 244 from tachometer 56 through resistor 246, and has a plurality of outputs R31–R40 connected in parallel to input 234 of amplifier A4.

As engine speed increases, the voltage at U4 input 244 from tachometer 56 increases, which in turn sequentially turns on resistors R31 through R40 in stepwise manner. When the first output turns on, resistor R31 is connected in circuit with amplifier input 234 such that current flows from input 234 through resistor R31 to ground reference at 248. This sinking of current through resistor R31 from input 234 lowers the voltage at input 234 which in turn reduces the voltage at amplifier output 236 because less gain is needed to keep the voltage at input 232 equal to that at input 234. As engine speed continues to increase, the voltage at U4 input 244 increases, and when it reaches the next threshold, the output at R32 is turned on, to also connect resistor R32 in circuit with amplifier input 234 such that additional current flows from input 234 through resistor R32 to ground reference at 248, thus further lowering the voltage at amplifier input 234 and hence lowering the voltage at amplifier output 236. As engine speed continues to increase, the voltage at input 244 increases, and the remaining resistors R33 through R40 are sequentially turned on. The values of resistances R31 through R40 are chosen to provide a linear dividing function, in order to divide $FP_D$ by S. Chip driver U4 thus functions like chip driver U1'. Resistors R31 through R40 each have the same resistance, 100 K ohms. The voltage from ramp generator 88 is applied through resistor 250 to be superimposed and added to the voltage at U4 input 244 to smooth out the stepwise changing of resistance at the outputs of U4, in order to provide a smoother change, as above.

The output at node 116 representing $(P_D P_A)/ST$ is multiplied by a given constant as needed to facilitate comparison against the output of amplifier A4 representing $FP_D/S$. A desired constant is provided by amplifier A6 having a noninverting input 252 connected to node 116, an inverting input 254, and an output 256 connected in a voltage divider network formed by resistors 258 and 260 in a feedback loop to input 254 to set the gain of amplifier A6 and hence the desired constant.

Amplifier A5 is a comparator and compares $(P_D P_A)/ST$ to $FP_D S$. Either or both factors may be multiplied by suitable constants to facilitate comparison. The output of amplifier A5 includes an RC filter provided by resistor 262 and capacitor 264 for filtering out the ramp frequency of generator 88. The output of amplifier comparator A5 is connected to solenoid valve 206 to control the amount of fuel supplied according to combustion air and fuel flow velocity. In one embodiment, solenoid valve 206 is driven by a variable duty cycle oscillator 205, the frequency of which is a function of engine speed S as output by tachometer 56 and the duty cycle of which is a function of the output of comparator A5.

The '626 parent invention may be used in combination with the '464 parent invention which utilizes a mass flow system for sensing the amount of combustion air supplied to the engine, or the '626 parent invention may be used with other systems sensing or determining the amount of combustion air supplied to the engine. The '626 parent invention provides a system which responds both to the amount of combustion air and to the fuel flow velocity, and controls the fuel supply means, to control the amount of fuel supplied according to combustion air and fuel flow velocity. Orifice 213 is between the fuel supply and the engine, and produces a fuel pressure drop indicating fuel flow velocity which is fed back to solenoid valve 206 controlling fuel flow to outlet 214. The '626 parent invention provides a feedback fuel metering control system without a high pressure fuel pump, without high pressure fuel injectors and without a constant fuel pressure regulator.

Figure 9:
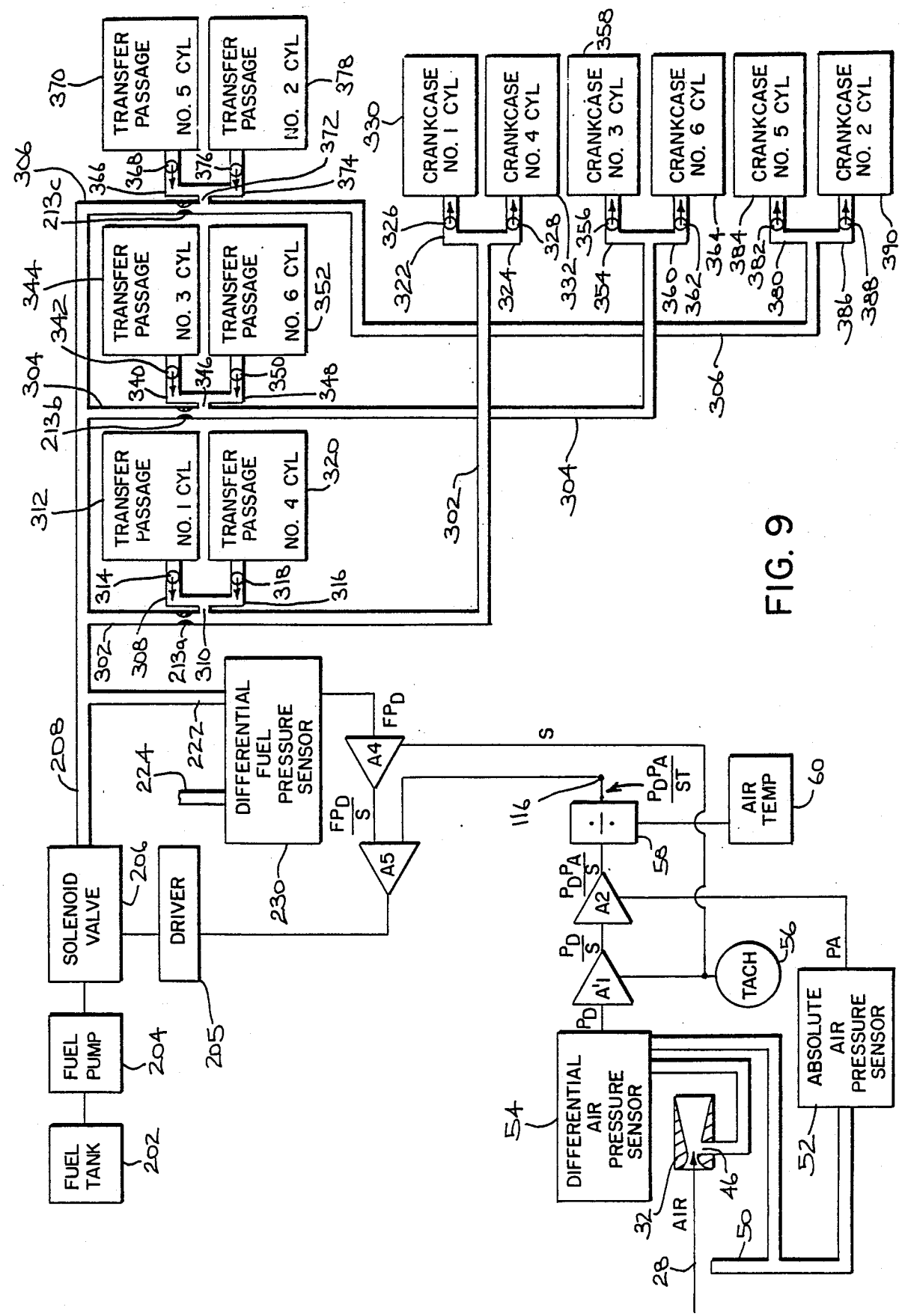
FIG. 9 is a schematic block diagram similar to FIG. 6 but shows the system of the invention of my above noted parent application Ser. No. 07/178,383.

FIGS. 9–14 show the system of my above noted '383 parent application and use like reference characters from FIGS. 1–8 where appropriate to facilitate clarity. In FIG. 9, fuel line 208 has three branches 302, 304, and 306, one branch for each two cylinders. The branches have respective restriction orifices 213a, 213b, and 213c, corresponding to the respective restriction orifice 213 in FIG. 6.

A conduit 308 is connected between the engine crankcase at the number 1 cylinder, preferably at a transfer port cover, for example as shown at 44 in U.S. Pat. No. 4,549,507, incorporated herein by reference, and the fuel line downstream of restriction orifice 213a at opening 310 in fuel line branch 302. Conduit 308 passes warmed pressurized air-fuel mixture from the crankcase through the respective transfer passage 312 covered by the respective transfer port cover, and through a one-way check valve 314 to the fuel line at opening 310 to improve fuel atomization. Conduit 308 could be connected to other portions of the crankcase chamber for the number 1 cylinder, though connection to the transfer passage is preferred. In like manner, conduit 316 and one-way check valve 318 are connected between transfer passage 320 and fuel line branch 302 at opening 310 downstream of restriction orifice 213a and in common with conduit 308. Transfer passages 312 and 320 are for the number 1 and number 4 cylinders, respectively, having pistons with power strokes 180° apart.

Figure 12:
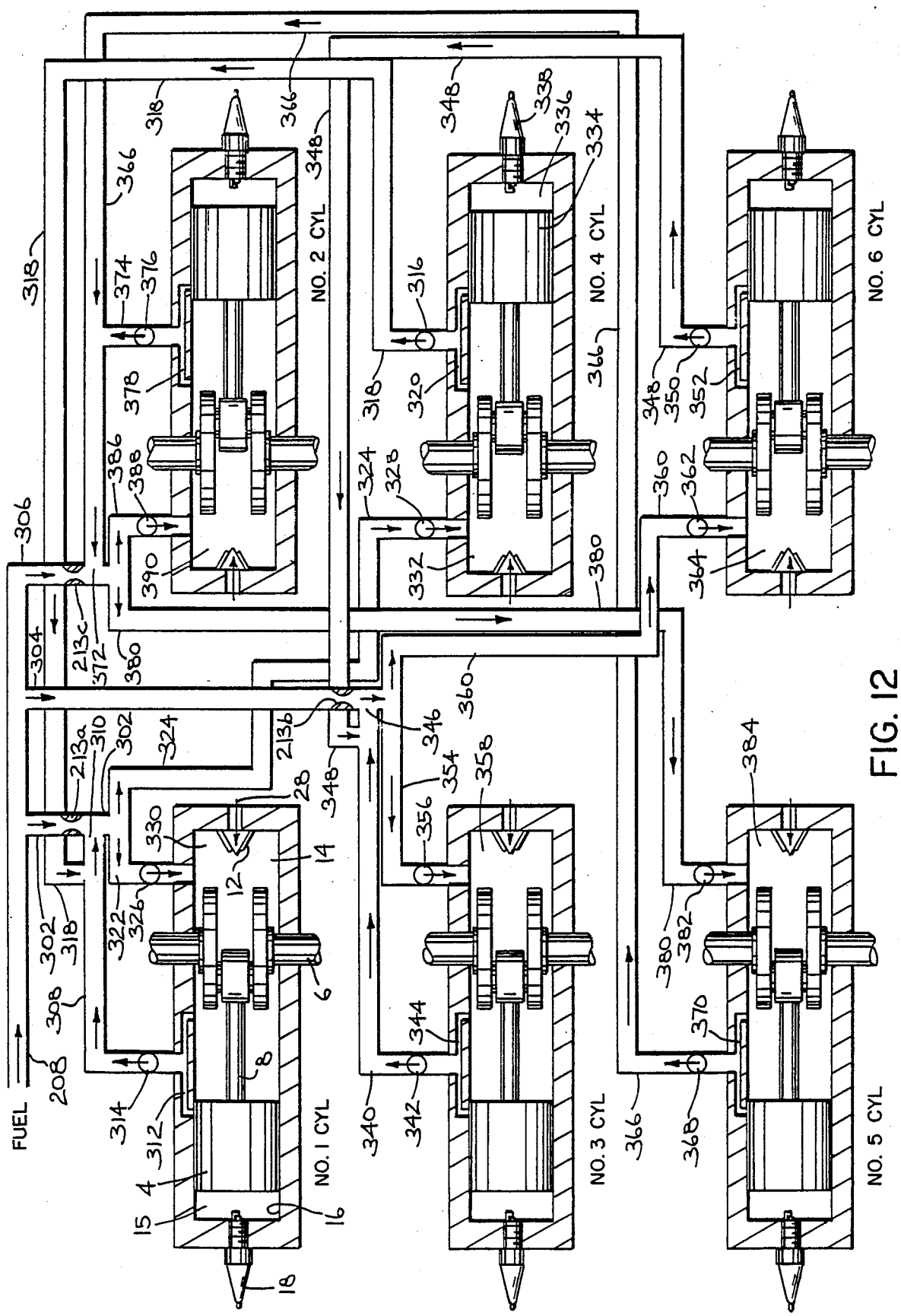
FIG. 12 is a partially schematic diagram further showing the fuel supply system of FIG. 9.

Fuel line branch 302 continues downstream from restriction orifice 213a and supplies fuel through a pair of sub-branches 322 and 324 and respective one-way check valves 326 and 328 to respective crankcase chambers 330 and 332 for the number 1 and number 4 cylinders, respectively, FIGS. 9 and 12. Referring to FIG. 12, when cylinder number 1 is in its power cycle, piston 4 is moving rightwardly away from spark plug 18 and combustion chamber 15 toward crankcase chamber 14 compressing the latter and supplying a pressurized air-fuel mixture from crankcase 14 through transfer passage 312 and one-way check valve 314 and through conduit 308 to fuel line branch 302 at opening 310 downstream of restriction orifice 213a, which improves atomization of fuel from fuel pump 204 and solenoid driver 206 supplied through fuel line 208. The fuel then flows through fuel line sub-branch 324 and one-way check valve 328 to crankcase chamber 332 of the number 4 cylinder which is in its charging cycle with piston 334 moving away from crankcase chamber 332 and toward combustion chamber 336 and spark plug 338.

As noted above, the number 1 and number 4 cylinders have pistons with power strokes which are 180° apart. When the number 4 cylinder is in its power cycle, piston 334 moves away from spark plug 338 and combustion chamber 336 and toward crankcase chamber 332, compressing the latter and supplying a warmed pressurized air-fuel mixture from crankcase chamber 332 through transfer passage 320 and through conduit 316 and one-way check valve 318 to fuel line branch 302 at opening 310 downstream of restriction orifice 213a, to improve atomization of fuel in fuel line branch 302. The fuel is supplied through fuel line branch 302 and sub-branch 322 and one-way check valve 326 to crankcase chamber 14 of the number 1 cylinder which is then in its charging cycle with piston 4 moving away from crankcase chamber 14 and toward combustion chamber 15 and spark plug 18.

FIG. 12 shows the six cylinders separated for schematic illustration, similarly as shown in the above noted *Outboard Service Training Notebook* at page 104, though all cylinders share the same crankshaft 6, with cylinders 1, 3 and 5 forming one bank, and cylinders 2, 4 and 6 forming the other bank of the V-6 one of which banks is shown in FIG. 11. As above, solenoid valve 206 in fuel line 208 upstream of restriction orifice 213a responses to the sensed amount of combustion air and sensed flow velocity of fuel to control the amount of fuel metered from fuel pump 204 through solenoid valve 206, to control the amount of fuel supplied through fuel line 208 according to combustion air and fuel flow velocity. The remaining fuel line branches 304 and 306 are similar to fuel line branch 302 and connected in parallel therewith to fuel line 208. One fuel line branch is provided for each two cylinders.

Fuel line branch 304 includes restriction orifice 213b. Conduit 340 with one-way check valve 342 is connected between the crankcase of the number 3 cylinder at transfer passage 344 and fuel line branch 304 at opening 346 downstream of restriction orifice 213b. Conduit 348 with one-way check valve 350 is connected between the transfer passage 352 of the number 6 cylinder and opening 346 of fuel line branch 304 downstream of restriction orifice 213b. Fuel line branch 304 continues downstream from restriction orifice 213b and is connected through sub-branch 354 and one-way check valve 356 to the crankcase chamber 358 of the number 3 cylinder, and is also connected through sub-branch 360 and one-way check valve 362 to the crankcase chamber 364 of the number 6 cylinder. The number 3 and number 6 cylinders have pistons with power strokes 180° apart.

Fuel line branch 306 has a restriction orifice 213c. Conduit 366 and one-way check valve 368 are connected between the transfer passage 370 of the number 5 cylinder and opening 372 in fuel line branch 306 downstream of restriction orifice 213c. Conduit 374 and one-way check valve 376 are connected between the transfer passage 378 of the number 2 cylinder and opening 372 of fuel line branch 306 downstream of restriction orifice 213c. Fuel line branch 306 continues downstream from restriction orifice 213c and supplies fuel from fuel pump 204 and solenoid valve 206 and the warmed pressurized air-fuel mixture from the noted crankcase chambers and transfer passages 370 and 378. The downstream end of fuel line branch 306 is connected through sub-branch 380 and one-way check valve 382 to the crankcase chamber 384 of the number 5 cylinder, and is connected through sub-branch 386 and one-way check valve 388 to the crankcase chamber 390 of the number 2 cylinder. The number 2 and number 5 cylinders have pistons with power strokes 180° apart.

Fuel is supplied from fuel pump 204 and metered by solenoid valve 206 to fuel line 208 and fuel line branches 302, 304 and 306, and sub-branches 322 and 324, 354 and 360, and 380 and 386, to the respective crankcase chambers, all without a carburetor, without a high pressure fuel pump, without high pressure fuel injectors, and without a constant fuel pressure regulator. Fuel pump 204 is preferably of the type operated by pressure changes in the crankcase, for example the above noted *Outboard Service Training Notebook*, pp. 10–11, and for example as shown in above noted U.S. Pat. No. 3,924,975. Solenoid valve 206 is the above noted Brunswick Corp. Mercury Marine Part No. 43739 solenoid valve.

Figure 13:
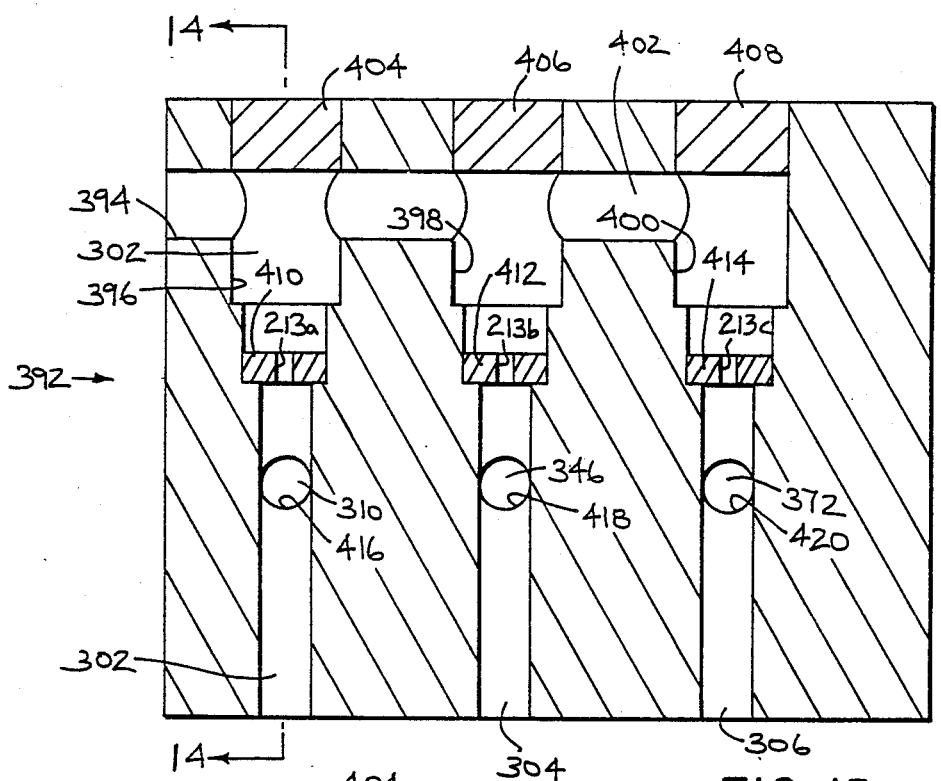
FIG. 13 is a sectional view of a fitting in the fuel line in accordance with the invention of the '383 parent application.
Figure 14:
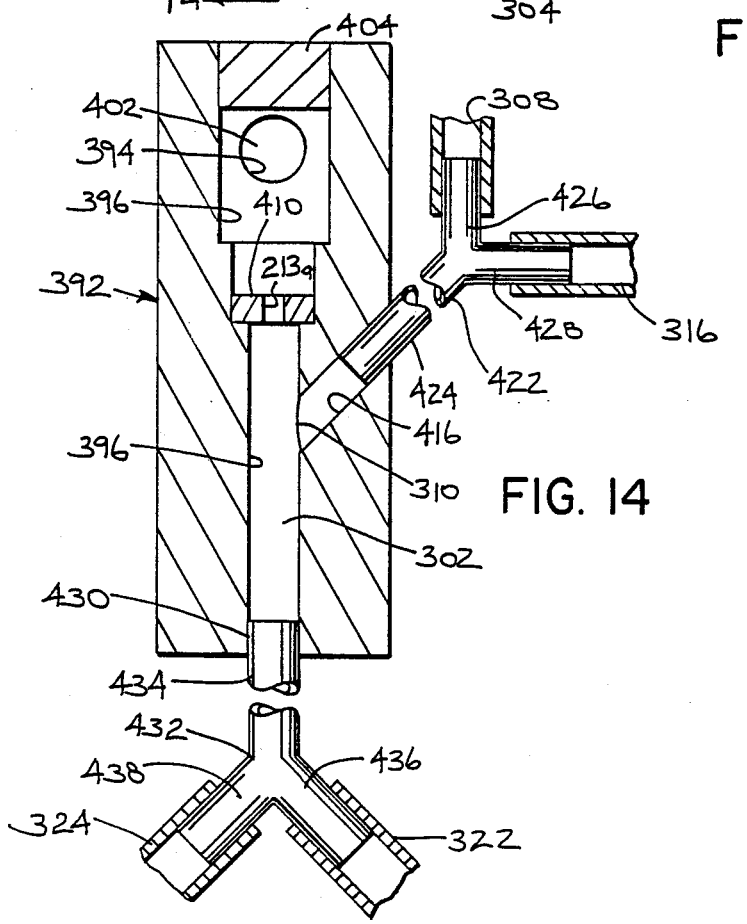
FIG. 14 is a sectional view taken along line 14—14 of FIG. 13.

FIGS. 13 and 14 show a fitting 392 in the fuel line providing the noted fuel line branches. Fitting 392 is a cast metal member having a fuel inlet 394 receiving fuel from fuel pump 204 and solenoid valve 206 controlling the amount of fuel supplied. Fitting 392 has three fuel passages 396, 398, 400, one for each two cylinders. Each fuel passage communicates with fuel inlet 394 through common transverse passage 402. The top ends of the passages are closed at plugs 404, 406, 408. Each passage has an annular grommet or ring 410, 412, 414, providing the respective restriction orifice 213a, 213b, 213c therein. The fitting has three air-fuel inlets 416, 418, 420, one for each of the fuel passages. Each air-fuel inlet communicates with a respective one of the fuel passages at the noted respective openings 310, 346, 372, downstream of the respective restrictive orifices 213a, 213b, 213c. Each air-fuel inlet has a Y-connection, as shown at 422 in FIG. 14 for air-fuel inlet 416. The yoke 424 of the Y is connected to air-fuel inlet 416. One outer leg 426 of the Y is connected to conduit 308, and the other outer leg 428 of the Y is connected to conduit 316. The downstream end of fuel passage 396 providing fuel line branch 302 has an outlet 430 with a Y-connection 432 having a yoke 434 in fuel passage outlet 430. One outer leg 436 of the Y is connected to fuel line sub-branch 322, and the other outer leg 438 of the Y is connected to fuel line sub-branch 324.

The '383 parent invention uses low pressure air from the crankcase chambers via the transfer passages that is mixed with fuel from metered source 204, 206 to deliver a fuel mixture to the crankcase of a two cycle engine. The low pressure air supply is preferably obtained from the transfer port or boost port area of the engine because the air is hotter and drier than that obtained directly from the crankcase. The air is fed through appropriate check valves 314, 318, 342, 350, 368, 376, to provide positive pressure into the air-fuel mixer provided by fitting 392. In the fitting, the hot pressurized air-fuel mixture is fed in through branch 416, FIG. 14, and the fuel is fed in through branch 396 to meet at the junction 310. It is preferred that mixer fitting 392 be physically located near the output of solenoid 206 to prevent metering errors due to head pressure in fuel line 208. The air-fuel and fuel mix is then fed to output 430 and Y-shaped divider 432 to sub-branches 322 and 324 and respective crankcase chambers for that respective pair of cylinders that fire 180° apart. This enables a single fuel line branch such as 302 to accurately meter fuel to two cylinders. Fuel passages 398 and 400 are provided with output fittings comparable to Y-shaped output fitting 432. Fuel-air inlets 418 and 420 are provided with inlet fittings comparable to Y-shaped inlet fitting 422.

Figure 10:
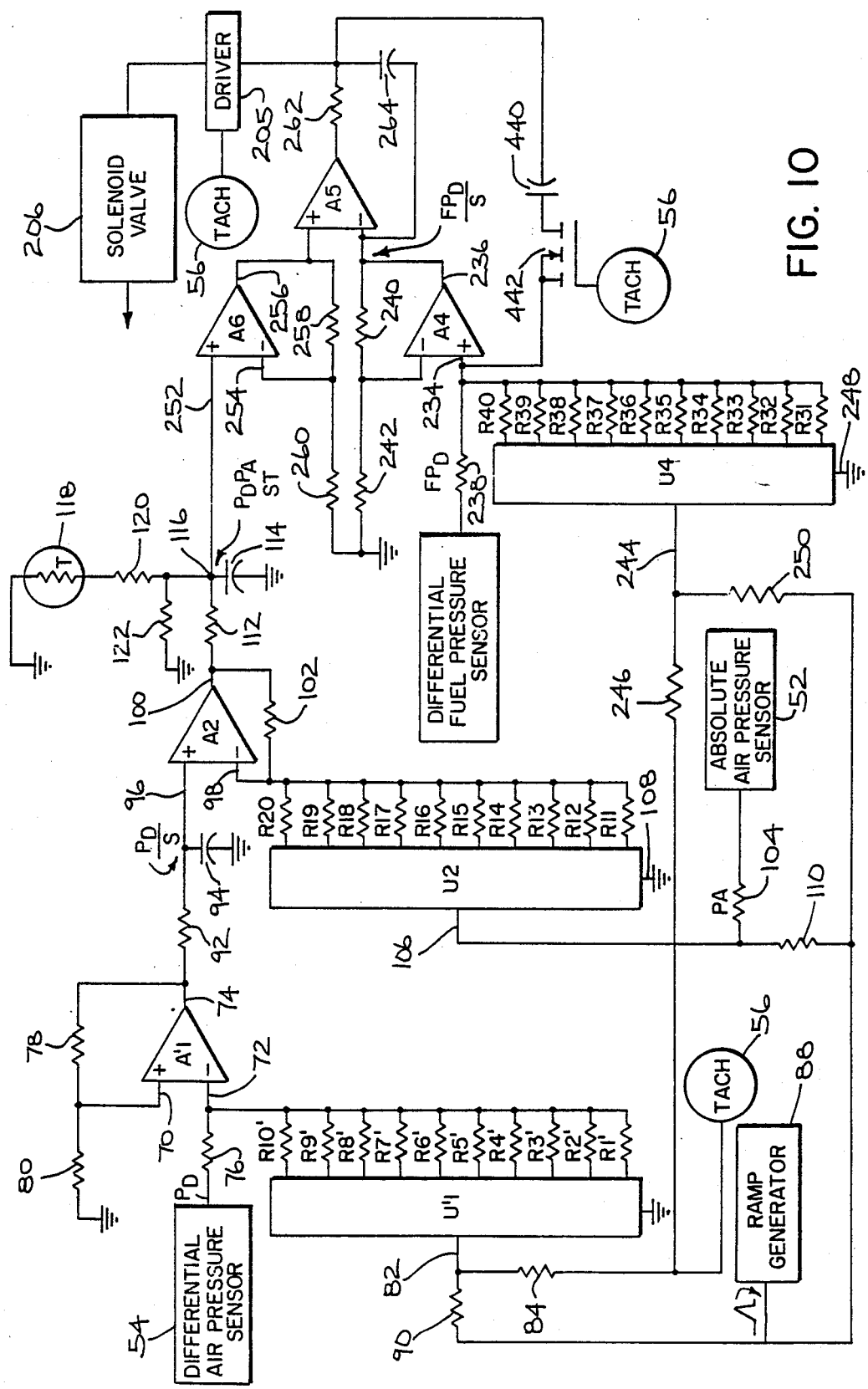
FIG. 10 is a circuit diagram similar to FIG. 7, but shows modifications in accordance with the present invention.

FIG. 10 shows circuitry similar to FIG. 7 and like reference numerals are used where appropriate to facilitate clarity. FIG. 10 has been modified to include low pass filter capacitor 440 and FET 442 connected in series between the output of amplifier A5 through resistor 262 and noninverting input 234 of amplifier A4. FET 442 is gated into conduction in response to the output voltage of tachometer 56 when engine speed rises above 2,000 rpm. Below 2,000 rpm, FET 442 is an open switch. When solenoid valve 206 opens, it takes a finite time for the low pressure wave to travel down the fuel line to pressure sensor 230. In the meantime, the signal from amplifier A5 is out of phase, and when the pressure wave and such output signal get in phase, oscillation may occur at certain engine speeds above 2,000 rpm. Conductive FET 442 and capacitor filter 440 eliminate such oscillation.

In another modification, butterfly valve 40, FIG. 11, is provided with a hole 444 to provide better idling conditions, and allow butterfly valve to be closed during idle rather than being cracked open.

Figure 15:
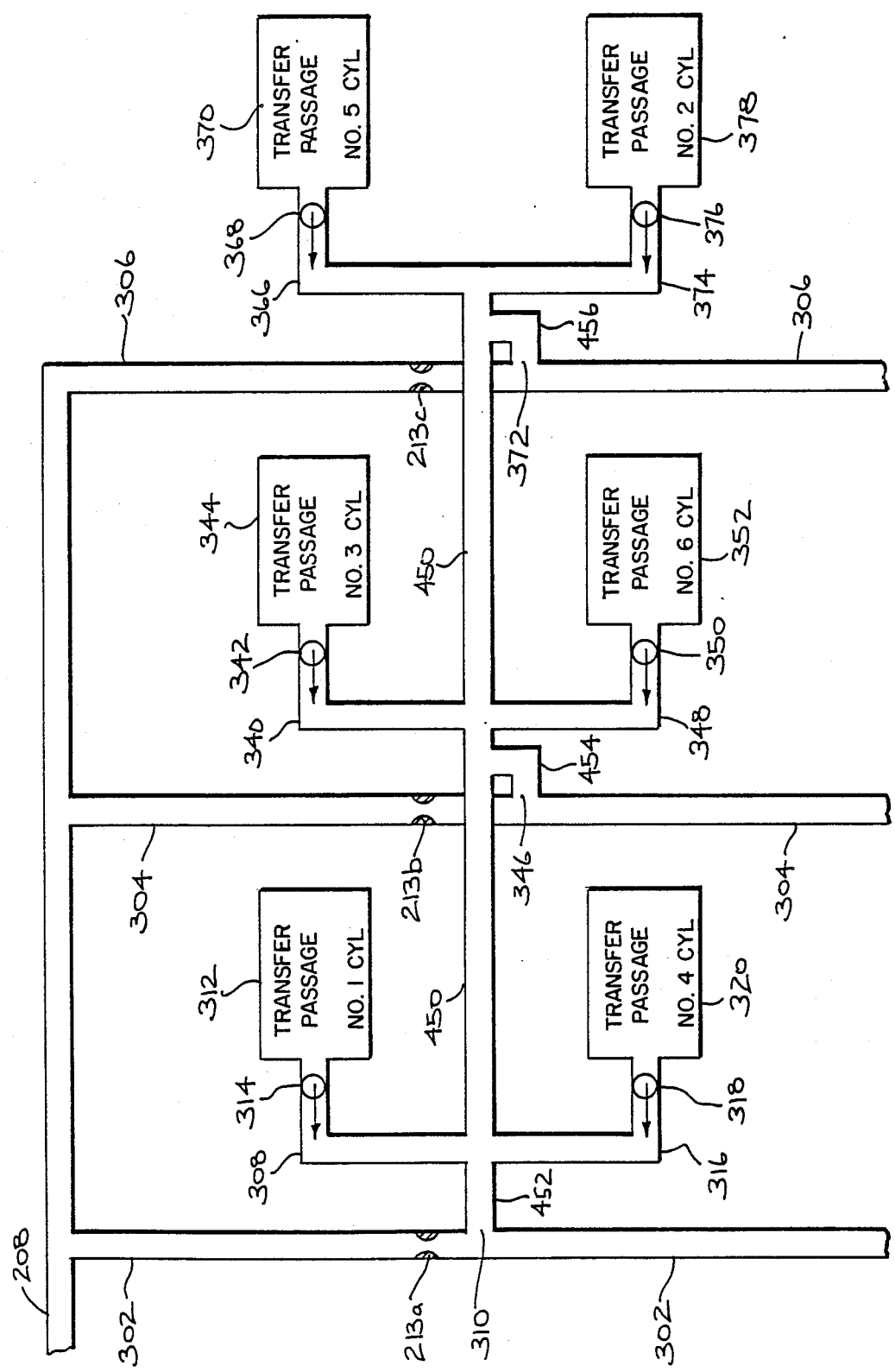
FIG. 15 is a view like FIG. 9 and shows a further embodiment.
Figure 16:
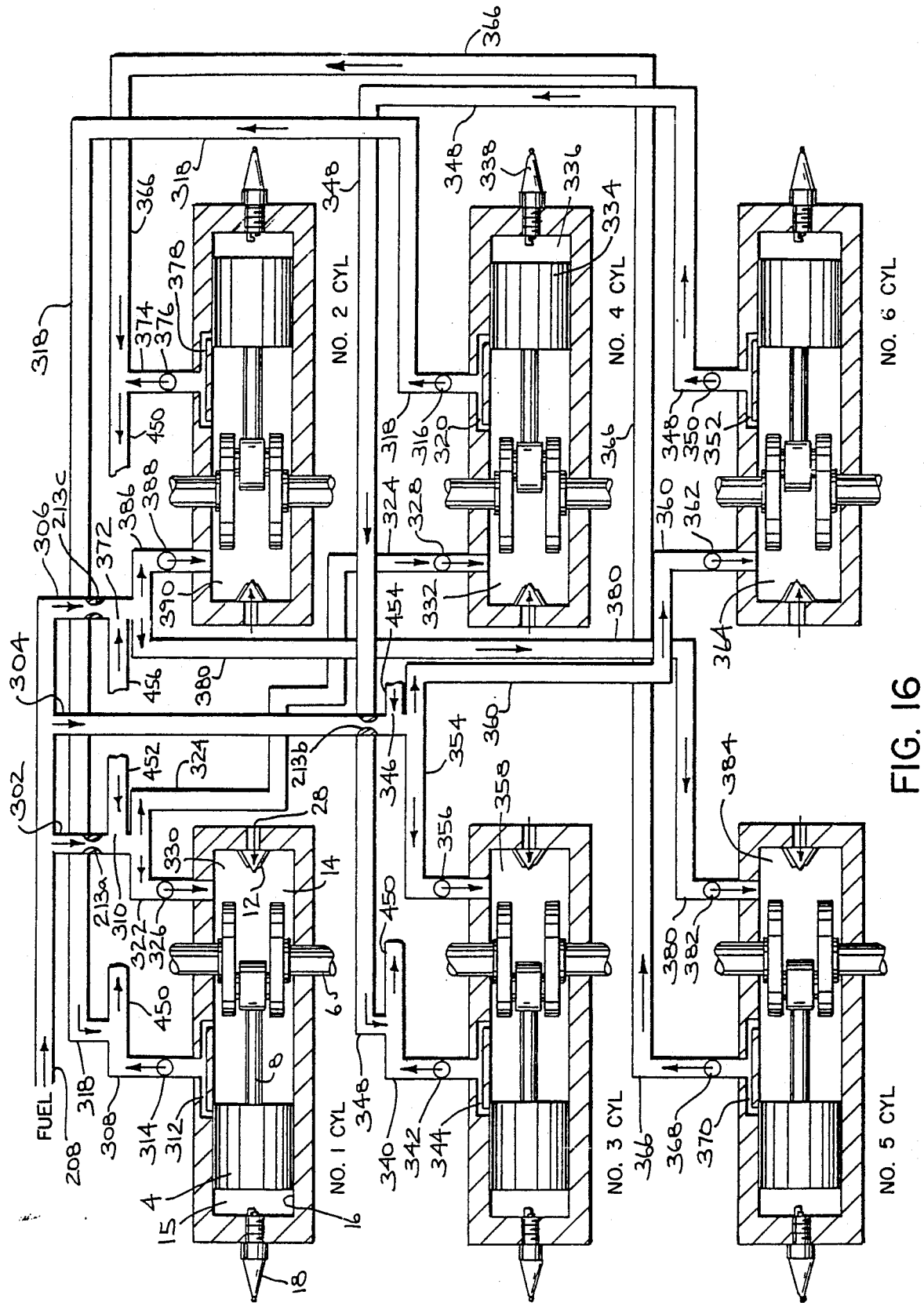
FIG. 16 is a view like FIG. 12 and further shows the embodiment of FIG. 15.

FIGS. 15 and 16 show a further embodiment and use like reference numerals from FIGS. 9 and 12, respectively, where appropriate to facilitate clarity. A common plenum passage 450 receives pressurized air-fuel mixture from each of the cylinders through their transfer passages 312, 320, 344, 352, 370, 378, and through respective one-way check valves 314, 318, 342, 350, 368, 376, and through respective conduits 308, 316, 340, 348, 366, 374. Common plenum passage 450 is connected by conduits 452, 454, 456 to respective fuel line branches 302, 304, 306 at respective openings 310, 346, 372 downstream of respective restriction orifices 213a, 213b, 213c. Common plenum passage 450 provides a common source of pressurized air-fuel mixture and minimizes pulsations in the pressurized air-fuel mixture supplied to fuel line branches 302, 304, 306. When the number 1, 3 and 5 cylinders are in their power cycle and the number 4, 6 and 2 cylinders are in their charging cycle, pressurized air-fuel mixture flows from cylinders 1, 3 and 5 through their respective transfer passages and through respective one-way check valves 314, 342, 368 in respective conduits 308, 340, 366 to common plenum passage 450 such that passage 450 provides a common source of pressurized air-fuel mixture which flows through conduits 452, 454, 456 to fuel line branches 302, 304, 306 and mixes with the fuel therein and flows through sub-branches 324, 360, 386 and their respective one-way check valves 328, 362, 388 to the number 4, 6, and 2 cylinders which are in their charging cycle. When the number 4, 6, and 2 cylinders are in their power cycle and the number 1, 3 and 5 cylinders are in their charging cycle, pressurized air-fuel mixture flows from the number 4, 6 and 2 cylinders through their respective transfer passages and through respective one-way check valves 318, 350, 376 and through respective conduits 316, 348, 374 to common plenum passage 450. Passage 450 provides a common source of pressurized air-fuel mixture which flows through conduits 452, 454, 456 to respective fuel line branches 302, 304, 306 downstream of respective restriction orifices 213a, 213b, 213c and mixes with the fuel therein and flows through sub-branches 322, 354, 380 and respective one-way check valves 326, 356, 382 to the number 1, 3 and 5 cylinders which are in their charging cycle.

Present Invention

FIGS. 17-22 show the present invention and use like reference characters from FIGS. 1-16 where appropriate to facilitate clarity.

Throttle plate 40 is pivotable about pivot 42 between a high speed position (not shown) parallel to the direction of air flow at 28 axially through venturi 32, and a low speed position as shown in FIG. 17 permitting minimal air flow through the venturi. In the idle speed position, throttle plate 40 extends diagonally across the venturi and has an upstream end 40a and a downstream end 40b. Incoming air flows through the gap between top upsteam end 40a and the sidewall of the venturi, and also flows through the gap between lower downstream end 40b and the sidewall of the venturi. Air flow past lower downstream end 40b of the throttle plate is shown at paths 28a and 28b, FIG. 17, which paths curve downwardly to get around the lower edge of downstream end 40b of the throttle plate. Air flowing along path 28b flows downwardly into open inner end 45 of tube 46 to increase sensed pressure thereat and hence reduce the sensed pressure differential $P_D$, which in turn provides a weakened reduced signal for fuel supply control at idle and low speed.

The present invention amplifies the air flow signal through the venturi by pneumatically amplifying the sensed pressure differential. This is done by reducing the sensed pressure at the inner end 45 of air pressure sensor 46. This in turn is accomplished by altering the air flow path at pressure sensor end 45 to create a vacuum thereat relative to the remaining air flow through venturi 32. This is accomplished by providing an air by-pass hole 40c, FIG. 18, in butterfly valve or throttle plate 40 downstream of sensor tube 46.

By-pass hole 40c through throttle plate 40 directs air flow along a given direction as shown at 28c, FIG. 18, past inner end 45 of sensor 46 and through by-pass hole 40c when throttle plate 40 is in its idle position. The air flow along path 28c prevents an increase of sensed pressure at sensor end 45, whereby to maintain a sufficient sensed pressure differential between the sensed pressure outside of the venturi at sensor 50 and the sensed pressure in the venturi at sensor 46, including at idle. As noted above, sensor 46 is a tube with an inner open end 45 in venturi 32. By-pass hole 40c directs air flow along direction 28c preventing air flow into inner end 45 of tube 46 and instead creating a vacuum to pull air out of inner end 45 of tube 46 and further reduce the pressure thereat.

In one embodiment as shown in FIG. 18, by-pass hole 40c is substantially axially aligned with inner end 45 of tube 46 such that the given direction of air flow is along path 28c extending perpendicularly to tube 46 and past and proximate inner end 45 of the tube and then through by-pass hole 40c.

In another embodiment as shown in FIG. 19, by-pass hole 40d includes at least an upper portion spaced inwardly toward the center of the venturi away from and downstream of inner end 45 of tube 46 such that a given direction of air flow is along a path 28d extending partially and at an angle toward the center of the venturi and away from inner end 45 of tube 46 as the air passes inner end 45 and then flows through by-pass hole 40d, whereby to further increase the vacuum at inner end 45 of tube 46 and further reduce the pressure thereat. This in turn provides a further increased pressure differential signal $P_D$.

In the disclosed embodiment, the diameter at outer mouth 30 is about 5", the diameter of venturi 32 is about 3¼", butterfly valve throttle plate 40 is offset in the idle position by about 5°, i.e. 5° from vertical as viewed in FIG. 17, tube 46 extends radially into venturi 32 to a depth at inner end 45 of about ¼", and is spaced upstream from throttle plate end 40b in the idle position by about ¾". Sensor tube 46 extends inwardly into venturi 32 along a radial direction intersecting pivot axis 42 of throttle plate 40 and perpendicular thereto. Pivot axis 42 is perpendicular to axial air flow direction 28.

FIG. 20 illustrates operation of the system with no by-pass hole as in FIG. 17. FIG. 20 is a graph showing on the vertical axis fuel flow in pounds per hour, and on the horizontal axis engine speed in revolutions per minute, RPM, times a factor of 100. Upper curve RL shows the rich limit for idle and low speed operation, and lower curve LL shows the lean limit for such operation. Curve 517 shows the observed fuel flow with no by-pass hole as in FIG. 17. It is noted that this mass flow tracking is below the lean limit, and produces rough idle, and may require additional correction for the engine to keep running.

FIG. 21 shows operation for the system of FIG. 18. In FIG. 18, a by-pass hole 40c of diameter 0.125" is provided, in combination with the above noted parameters. As shown in FIG. 21, the fuel flow tracking at curve 418 is below the lean limit until engine speed reaches 1500 RPM. This is an improvement over FIG. 20, but there is still a range of engine speed between 500 and 1500 RPM where the fuel-air ratio is too lean.

FIG. 22 illustrates operation of the system of FIG. 19 wherein the diameter of by-pass hole 40d is 0.188". In FIG. 22, it is seen that the fuel flow provided by the system of FIG. 19 as shown at curve 419 is always between lean limit LL and rich limit RL, and is about half way between such limits during all portions of idle and low speed operation between 500 RPM and 2,000 RPM. The system of FIG. 19 is thus preferred. The system of FIG. 18 as shown in FIG. 21 can be tolerated, but with appropriate correction, particularly below 1,500 RPM.

It is a significant feature of the invention that sensor 46 can be placed proximate throttle plate 40. In the disclosed embodiment, inner end 45 of sensor 46 is spaced upstream of throttle plate end 40b by about ¾", which is less than the 3¼" diameter of venturi 32. This is significant because in the present marine application it is desirable to provide the minimum axial dimension between throttle plate 40 and outer mouth 30, due to cowl dimension requirements, i.e. in marine applications a long intake throat and venturi cannot be accommodated without significant design changes affecting numerous other constraints of the marine drive, which in turn would render such extended throat dimension unacceptable.

By-pass hole 40c or 40d, FIGS. 18 and 19, may be provided in addition to or in place of hole 444, FIG. 11. The invention may be used with any of the fuel supply systems noted above, including the high pressure or low pressure fuel injection.

It is recognized that various equivalents, alternatives and modifications are possible within the scope of the appended claims.

I claim:

1. A fuel control system for an internal combustion engine having air intake means supplying combustion air to said engine, and fuel supply means supplying fuel to said engine, a venturi in said air intake means producing a pressure drop, a first pressure sensor sensing pressure outside of said venturi, a second pressure sensor sensing the reduced pressure in said venturi, and means pneumatically amplifying the sensed pressure differential.

2. The invention according to claim 1 wherein said pneumatic amplifier means comprises means for further reducing the pressure at said second pressure sensor.

3. The invention according to claim 2 wherein said means for reducing pressure at said second pressure sensor comprises means altering the air flow path in said venturi at said second pressure sensor.

4. The invention according to claim 3 wherein said means altering said air flow path at said second sensor directs air flow away from said second sensor to create a vacuum thereat relative to the remaining air flow through said venturi and create a pressure drop between air outside of said venturi and air at said second sensor which is greater than the pressure drop between air outside of said venturi and the air inside said venturi away from said second sensor.

5. A fuel control system for an internal combustion engine having air intake means supplying combustion air to said engine, fuel supply means supplying fuel to said engine, a venturi in said air intake means producing a pressure drop, a first pressure sensor sensing pressure outside of said venturi, a second pressure sensor sensing the reduced pressure in said venturi, a throttle plate in said venturi and pivotable between a high speed position permitting substantial air flow through said venturi, and a low speed idle position permitting minimal air flow through said venturi, wherein said second pressure sensor extends into said venturi and has an inner end spaced upstream of said throttle plate in said idle position, said throttle plate having a by-pass hole therethrough directing air flow along a given direction past said inner end of said second sensor and through said by-pass hole when said throttle plate is in said idle position, said given direction of air flow past said inner end of said second sensor preventing an increase of sensed pressure thereat, whereby to maintain a sufficient sensed pressure differential between the sensed pressure outside of said venturi and the sensed pressure in said venturi, including at idle.

6. The invention according to claim 5 wherein said second sensor comprises a tube with an inner end in said venturi, and wherein said by-pass hole directs air flow along said given direction along a path preventing air flow into said inner end of said tube and instead creating a vacuum to pull air out of said inner end of said tube and further reduce the pressure thereat.

7. The invention according to claim 6 wherein said by-pass hole is substantially aligned with said inner end of said tube such that said given direction of air flow is along a path extending perpendicularly to said tube and past and proximate said inner end of said tube and then through said by-pass hole.

8. The invention according to claim 6 wherein said by-pass hole includes at least a portion spaced inwardly toward the center of said venturi away from and downstream of said inner end of said tube such that said given direction of air flow is along a path extending partially and at an angle toward the center of said venturi and away from said inner end of said tube as the air passes said inner end of said tube and then flows through said by-pass hole, whereby to increase the vacuum at said inner end of said tube and further reduce the pressure thereat.

9. The invention according to claim 6 wherein said by-pass hole has a first portion substantially aligned with said inner end of said tube such that said given direction of air flow includes a first component along the path extending perpendicularly to said tube and past and proximate said inner end of said tube and then through said by-pass hole, and wherein said by-pass hole has a second portion spaced inwardly toward the center of said venturi away from and downstream of said inner end of said tube such that said given direction of air flow has a second component along a path extending partially and at an angle toward the center of said venturi and away from said inner end of said tube as the air passes said inner end of said tube and then flows through said second portion of said by-pass hole, whereby the increase the vacuum at said inner end of said tube and further reduce the pressure thereat.

10. A fuel control system for an internal combustion engine having air intake means supplying combustion air to said engine, fuel supply means supplying fuel to said engine, a venturi in said air intake means producing a pressure drop, a throttle plate in said venturi and pivotable between a high speed position permitting substantial air flow through said venturi, and a low speed idle position permitting minimal air flow through said venturi, a first pressure sensor sensing pressure outside of said venturi, a second pressure sensor sensing the reduced pressure in said venturi and spaced upstream of said throttle plate in said idle position by a distance less than the diameter of said venturi.

11. The invention according to claim 10 wherein air flows axially through said venturi, said throttle plate is pivotable about an axis extending perpendicularly to said axial direction of air flow, said second sensor extends radially into said venturi along a radial direction substantially perpendicularly to said pivot axis of said throttle plate.

12. The invention according to claim 10 wherein said throttle plate in said idle position extends diagonally across said venturi to have one end which is more upstream than the other end in said idle position, and wherein said second sensor is spaced upstream of said other end of said throttle plate and wherein said second sensor extends along a radial direction intersecting said pivot axis of said throttle plate and perpendicular thereto, and wherein said second sensor has an inner end spaced radially outwardly of said pivot axis of said throttle plate.

13. The invention according to claim 12 wherein said throttle plate has a by-pass hole therethrough directing air flow along a given direction past said inner end of said second sensor and through said by-pass hole when said throttle plate is in said idle position, said given direction of air flow past said inner end of said second sensor preventing an increase of sensed pressure thereat, whereby to maintain a sufficient sensed pressure differential between the sensed pressure outside of said venturi and the sensed pressure in said venturi, including at idle.

14. The invention according to claim 13 wherein said venturi has a diameter of about $3\frac{1}{4}''$, said second sensor extends radially into said venturi about $\frac{1}{4}''$, and said second sensor is spaced upstream of said other end of said throttle plate by about $\frac{3}{4}''$.

15. The invention according to claim 14 wherein the diameter of said by-pass hole is about 0.125".

16. The invention according to claim 14 wherein the diameter of said by-pass hole is about 0.188".

17. A fuel control system for an internal combustion engine having air intake means supplying combustion air to said engine, fuel supply means supplying fuel to said engine, air flow velocity sensing means comprising a venturi in said air intake means producing a pressure drop, a throttle plate in said venturi and pivotable between a high speed position permitting substantial air flow through said venturi, and a low speed idle position permitting minimal air flow through said venturi, means measuring the differential pressure $P_D$ between the absolute pressure outside of said venturi means and the reduced pressure in said venturi means comprising a first pressure sensor sensing pressure outside of said venturi and a second pressure sensor sensing the reduced pressure in said venturi, said second pressure sensor extending into said venturi and having an inner end spaced upstream of said throttle plate in said idle position, a by-pass hole in said throttle plate directing air flow along a given direction past said inner end of said second sensor and through said by-pass hole when said throttle plate is in said idle position, said given direction of air flow past said inner end of said second sensor preventing an increase of sensed pressure thereat, whereby to maintain a sufficient sensed pressure differential between the sensed pressure outside of said venturi and the sensed pressure in said venturi, including at idle, means calculating said air flow velocity as a function of $P_D$, means sensing the mass of said combustion air comprising said first pressure sensor measuring the absolute air pressure $P_A$ outside of said venturi and temperature sensor means measuring air temperature T and calculating said air mass as a function of $P_A$ and T, means responsive to said air flow velocity sensor means and said air mass sensor means and controlling said fuel supply means, whereby to provide a mass flow fuel control system.

18. The invention according to claim 17 wherein said air flow velocity sensing means measures $P_D$ and calculates $\sqrt{P_D}$ to determine said air flow velocity, said air mass sensing means measures $P_A$ and T and calculates $\sqrt{P_A/T}$ to determine said air mass, said means controlling said fuel supply means comprises means for controlling the amount of fuel supplied according to $\sqrt{P_D}$ and $\sqrt{P_A/T}$.

19. The invention according to claim 18 wherein said fuel supply means comprises fuel injector means, and wherein said means controlling said fuel supply means comprises means controlling said fuel injector means comprising means supplying injection pulses for said fuel injector means to control the amount of fuel injected, wherein the length of said injector pulses is a factor of $\sqrt{P_D P_A/T}$.

20. The invention according to claim 17 comprising means sensing the flow velocity of fuel supplied to said engine comprising means between said fuel supply means and said engine and producing a fuel pressure drop indicating fuel flow velocity, means between said fuel supply means and said engine and responsive to said air flow velocity sensing means and to said air mass sensing means and to said means sensing said flow velocity of fuel and controlling fuel flow without a carburetor, to control the amount of fuel supplied to said engine according to said combustion air and said fuel flow velocity.

21. The invention according to claim 20 wherein said fuel supply means includes a low pressure fuel pump, and said means controlling fuel flow meters pumped fuel from said fuel pump directly into a fuel line connected to said means producing said fuel pressure drop, without a high pressure fuel pump, without high pressure fuel injectors, and without a constant fuel pressure regulator.

22. The invention according to claim 21 wherein said means sensing fuel flow velocity further comprises first fuel pressure sensor means between said fuel supply means and said means producing said fuel pressure drop and sensing fuel pressure upstream of said means producing said fuel pressure drop, and second fuel pressure sensor means sensing pressure downstream of said means producing said fuel pressure drop.

23. The invention according to claim 22 comprising differential fuel pressure sensor means measuring the differential fuel pressure between said first and second fuel pressure sensor means, and wherein said means controlling said fuel flow comprises a solenoid valve controlling fuel flow to said means producing said fuel pressure drop, and comprising means comparing said differential fuel pressure and said amount of combustion air and controlling said solenoid valve.

* * * * *